(12) United States Patent
Ma et al.

(10) Patent No.: US 10,913,809 B2
(45) Date of Patent: Feb. 9, 2021

(54) CROSS-LINKED POLYMERIC MATERIAL

(71) Applicant: CORNELL UNIVERSITY, Ithaca, NY (US)

(72) Inventors: Lin Ma, Santa Clara, CA (US); Lynden Archer, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 95 days.

(21) Appl. No.: 16/306,621

(22) PCT Filed: Jun. 19, 2017

(86) PCT No.: PCT/US2017/038132
§ 371 (c)(1),
(2) Date: Dec. 3, 2018

(87) PCT Pub. No.: WO2017/219020
PCT Pub. Date: Dec. 21, 2017

(65) Prior Publication Data
US 2019/0194373 A1   Jun. 27, 2019

Related U.S. Application Data

(60) Provisional application No. 62/351,538, filed on Jun. 17, 2016.

(51) Int. Cl.
*C08F 220/28* (2006.01)
*H01M 2/14* (2006.01)
(Continued)

(52) U.S. Cl.
CPC ...... *C08F 220/28* (2013.01); *C08F 122/1006* (2020.02); *C08F 222/1006* (2013.01);
(Continued)

(58) Field of Classification Search
USPC .............................. 521/27, 31; 526/240, 320
See application file for complete search history.

(56) References Cited

U.S. PATENT DOCUMENTS 5,203,982 A * 4/1993 MacDonald ........... C08J 5/2256
                                                         204/630
5,350,820 A    9/1994 Ono et al.
(Continued)

FOREIGN PATENT DOCUMENTS

CN         1333933 A      1/2002
CN       102775628 A     11/2012
(Continued)

OTHER PUBLICATIONS

Roh, et al, "Polymer Electrolyte Membranes Fabricated from Poly-(ethylene glycol dimethylmethacrylate-co-styrene sulfonic acid) Copolymers for Direct Methanol Fuel Cell Application", Macromolecular Research, vol. 20, No. 2, 197-204 (2012) (Year: 2012).*

(Continued)

*Primary Examiner* — Fred M Teskin
(74) *Attorney, Agent, or Firm* — Heslin Rothenberg Farley & Mesiti P.C.

(57) ABSTRACT

A cross-linked polymeric material is formed by polymerizing a polyethylene glycol di(meth)acrylate and a sulfonate salt containing a double bond that facilitates covalent bonding of the sulfonate salt to the polyethylene glycol di(meth)acrylate. In the polymeric material, cations from the salt are optionally replaced with metal ions selected from sodium, lithium, aluminum, magnesium, and zinc. Related methods and membranes and batteries including the cross-linked polymeric material are also provided.

20 Claims, 20 Drawing Sheets

(51) Int. Cl.
H01M 2/16 (2006.01)
D06M 13/278 (2006.01)
C08F 222/10 (2006.01)
C08F 122/10 (2006.01)
C08F 228/02 (2006.01)
H01M 10/052 (2010.01)
H01M 10/054 (2010.01)
H01M 4/38 (2006.01)

(52) U.S. Cl.
CPC ......... *C08F 228/02* (2013.01); *D06M 13/278* (2013.01); *H01M 2/145* (2013.01); *H01M 2/1653* (2013.01); *C08F 220/286* (2020.02); *H01M 4/38* (2013.01); *H01M 10/052* (2013.01); *H01M 10/054* (2013.01)

(56) References Cited

U.S. PATENT DOCUMENTS

| | | | |
|---|---|---|---|
| 6,221,248 | B1 | 4/2001 | Lin et al. |
| 6,344,584 | B2 * | 2/2002 | Lin ................. C08F 212/14 556/139 |
| 6,746,803 | B1 | 6/2004 | Bauer et al. |
| 7,989,110 | B2 | 8/2011 | Cavaille et al. |
| 9,118,056 | B2 | 8/2015 | Heo et al. |
| 2005/0244695 | A1 | 11/2005 | Kiefer et al. |
| 2010/0203782 | A1 | 8/2010 | Willis et al. |
| 2011/0017954 | A1 | 1/2011 | Akikaze et al. |
| 2011/0082222 | A1 | 4/2011 | Ziser et al. |
| 2011/0159362 | A1 | 6/2011 | Wakizaki et al. |
| 2012/0189898 | A1 | 7/2012 | Wakizaka et al. |
| 2013/0317128 | A1 | 11/2013 | Lin |
| 2015/0079485 | A1 | 3/2015 | Choi et al. |

FOREIGN PATENT DOCUMENTS

| | | |
|---|---|---|
| EP | 1942538 A2 | 7/2008 |
| JP | 2011181185 A | 9/2011 |
| WO | 00/36683 A2 | 6/2000 |
| WO | 01/30495 A1 | 5/2001 |
| WO | 2009/145188 A1 | 12/2009 |

OTHER PUBLICATIONS

Kwak, et al, "The effect of a molecular weight and an amount of PEGDA (poly(ethylene glycol)diacrylate) on a preparation of sodium methallyl sulfonate-co-PEGDA microspheres and sorption behavior of Co(II)", Chemcial Engineering Journal 223 (2013) 216-223. (Year: 2013).*

International Search Report and Written Opinion of the International Searching Authority for PCT/US2017/038132 dated Aug. 31, 2017.

Barghamadi, M., et al., "Lithium—sulfur batteries—the solution is in the electrolyte, but is the electrolyte a solution?", Energy & Environmental Science, vol. 7, pp. 3902-3920 (2014).

Yamaguchi, T., et al., "Pore-filling type polymer electrolyte membranes for a direct methanol fuel cell", Journal of Membrane Science, vol. 214, Issue 2, Abstract only (2003).

* cited by examiner

PEGMDA:VS=10:0

PEGMDA:VS=10:2

PEGMDA:VS=10:4

PEGMDA:VS=10:6

PEGMDA:VS=10:6 with solvent

CROSS-LINKED POLYMERIC MATERIAL

CROSS-REFERENCE TO RELATED APPLICATIONS

This application is a U.S. national phase entry under Section 371 of International Application No. PCT/US2017/038132, filed on Jun. 19, 2017, which published as WO 2017/219020 A1, which claims priority to U.S. Provisional Patent Application No. 62/351,538, filed Jun. 17, 2016. The entire contents of each of the prior applications are hereby incorporated herein by reference.

GOVERNMENT FUNDING

This invention was made with Government support under Grant Number IIP-1237622 awarded by the National Science Foundation (NSF). The United States Government has certain rights in the invention.

FIELD OF THE INVENTION

This invention relates to, inter alia, cross-linked polymeric materials, membranes and batteries comprising the material, and related methods.

BACKGROUND

The demand for high-energy batteries is increasing rapidly as there is a need for reliable and cost-effective energy storage in the emerging field of electric vehicles. Metal sulfur (e.g., Li—S) batteries have been studied as one of the most promising platforms for meeting these needs because of the high theoretical specific capacity of the sulfur cathode (1675 mAh/g), which is about eight times the typical values for the most promising intercalating cathodes (e.g. 200 mAh/g for $LiNi_{0.8}Co_{0.15}Al_{0.05}O_2$ (NCA)) in use within today's lithium-ion batteries (LIBs). When paired with a lithium metal anode, which also boasts more than 10-fold improvement in theoretical specific capacity (3800 mAh/g) relative to the graphitic carbon anode (360 mAh/g) used in LIBs, the sulfur cathode becomes legitimately one of the most important conversion cathodes because it enables a battery technology with exceptional specific energy per unit mass (2600 Wh/kg) or unit volume (2800 Wh/L). However, in metal sulfur batteries, problems arise due to propensity of higher order LiPS ($Li2Sx$, x>2) conversion reaction products created in the anode to dissolve in the electrolyte, migrate to the Li metal anode, and trigger parasitic reactions with the anode that erode both the cathode and anode in a cyclic process termed "shuttling". Thus, a need exists for new materials that are conducive toward use in an improved membrane that, inter alia, can serve to reduce such parasitic reactions and the resultant harm that they cause.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

In this specification, where a document, act or item of knowledge is referred to or discussed, this reference or discussion is not an admission that the document, act or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

Briefly, the present invention satisfies the need for, inter alia, new materials that are conducive toward use in an improved membrane.

The invention provides a new cross-linked material comprising units from a polyethylene glycol di(meth)acrylate and from a vinylsulfonic acid salt, wherein cations from the salt are replaced with metal ions.

Embodiments of the invention may address one or more of the problems and deficiencies discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

Certain embodiments of the presently-disclosed cross-linked materials and related compositions, devices, and processes have several features, no single one of which is solely responsible for their desirable attributes. Without limiting the scope of the cross-linked materials and related compositions, devices, and processes as defined by the claims that follow, their more prominent features will now be discussed briefly. After considering this discussion, and particularly after reading the section of this specification entitled "Detailed Description of the Invention," one will understand how the features of the various embodiments disclosed herein provide a number of advantages over the current state of the art. These advantages may include, e.g., without limitation, providing an ion-selective material, and improved membranes and devices (e.g., batteries) comprising the same.

In a first aspect, the invention provides a cross-linked polymeric material formed by polymerizing a polyethylene glycol di(meth)acrylate and a sulfonate salt containing a double bond that facilitates covalent bonding of the sulfonate salt to the polyethylene glycol di(meth)acrylate, wherein, in said polymeric material, cations from the salt are optionally replaced with metal ions selected from sodium, lithium, aluminum, magnesium, and zinc.

In a second aspect, the invention provides a membrane comprising a cross-linked polymeric material according to the first aspect of the invention.

In a third aspect, the invention provides a battery comprising the membrane according to the second aspect of the invention.

In a fourth aspect, the invention provides a method of making the cross-linked polymeric material according to the first aspect of the invention, or the membrane according to the second aspect of the invention, said method comprising:
  copolymerizing a reaction mixture comprising polyethylene glycol di(meth)acrylate and a sulfonate salt containing a double bond that facilitates covalent bonding of the sulfonate salt to the polyethylene glycol di(meth)acrylate; and
  performing ion exchange, thereby replacing cations from the salt with metal ions selected from sodium, lithium, aluminum, magnesium, and zinc, and combinations thereof.

These and other objects, features, and advantages of this invention will become apparent from the following detailed description of the various aspects of the invention taken in conjunction with the accompanying drawings.

BRIEF DESCRIPTION OF THE DRAWINGS

The present invention will hereinafter be described in conjunction with the following drawing figures. The depicted figures serve to illustrate various embodiments of the invention. However, the invention is not limited to the precise arrangements and instrumentalities of the embodiments depicted in the drawings.

FIG. 4A is a photographic image of a pure PEGDMA membrane; FIG. 4B is a photographic image of a sulfonate group containing membrane; FIG. 4C is an SEM image of the pure PEGDMA membrane; FIG. 4D is an SEM image of the sulfonate group containing membrane.

FIG. 5A is a zoom in FTIR of an embodiment of PEGDMA monomer and the sulfonate containing cross-linked membrane. FIG. 5B is a FTIR of cross-linked membrane embodiments with different contents of sulfonate groups.

FIG. 16A shows cycling performance of Li—S cells with prepared membranes cycled at 0.5 C with additive-free electrolyte, and FIG. 16B shows cycling performance of the Li—S cells with sandwich-type membrane cycled at 0.5 C with additive-free electrolyte.

DETAILED DESCRIPTION OF THE INVENTION

Figure 1A:
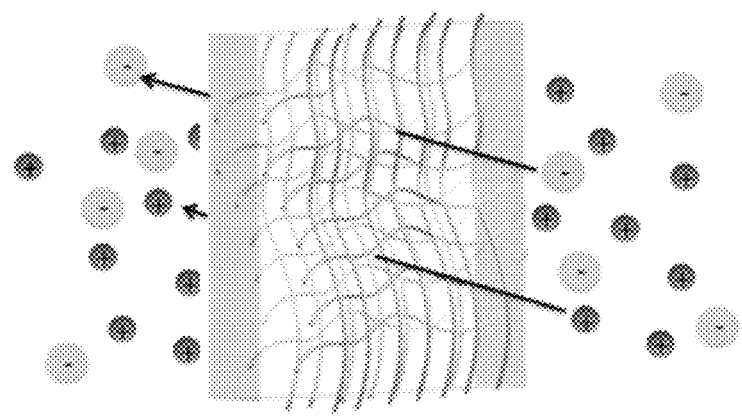
FIGS. 1A, B, and C are simple schematics illustrating operating hypotheses for how Celgard, Nafion, and a cross-linked PEGDMA membrane with dangling sulfonate groups according to an embodiment of the invention, respectively, regulate ion transport.

The present invention relates to, inter alia, cross-linked polymeric materials, membranes and batteries comprising the material, and related methods.

Aspects of the present invention and certain features, advantages, and details thereof are explained more fully below with reference to the non-limiting embodiments discussed and illustrated in the accompanying drawings. Descriptions of well-known materials, fabrication tools, processing techniques, etc., are omitted so as to not unnecessarily obscure the invention in detail. It should be understood, however, that the detailed description and the specific examples, while indicating embodiments of the invention, are given by way of illustration only, and not by way of limitation. Various substitutions, modifications, additions and/or arrangements within the spirit and/or scope of the underlying inventive concepts will be apparent to those skilled in the art from this disclosure.

In a first aspect, the invention provides a cross-linked polymeric material formed by polymerizing a polyethylene glycol di(meth)acrylate and a sulfonate salt containing a double bond that facilitates covalent bonding of the sulfonate salt to the polyethylene glycol di(meth)acrylate, wherein, in said polymeric material, cations from the salt are optionally replaced with metal ions selected from sodium, lithium, aluminum, magnesium, and zinc.

The first aspect of the invention provides a cross-linked polymeric material that comprises polyethylene glycol di(meth)acrylate units and units of the sulfonate salt containing a double bond that facilitates covalent bonding of the sulfonate salt to the polyethylene glycol di(meth)acrylate, wherein, in said polymeric material, cations from the salt are replaced with metal ions selected from sodium, lithium, aluminum, magnesium, and zinc. As recited herein, polyethylene glycol di(meth)acrylate units (or units of polyethylene glycol di(meth)acrylate, or the like) refer to units (which may also be referred to as "residues") from the polyethylene glycol di(meth)acrylate monomer that are present in the cross-linked polymeric material. In other words, the units are the structure of the polyethylene glycol di(meth)acrylate monomers following polymerization. The units differ from the monomer in that double bonds of the acrylate groups have opened to covalently bond to adjacent units in the polymeric material. As recited herein, sulfonate salt units (or units of sulfonate salt, or the like) refer to units (which may also be referred to as "residues") from the sulfonate salt that are present in the cross-linked polymeric material. In other words, the sulfonate salt units are the structure of the sulfonate salt monomers following polymerization. The units differ from the monomer in that the double bond of the sulfonate salt has opened to covalently bond to adjacent unit(s) in the polymeric material.

The sulfonate groups in the polymeric material functionalize the material and membranes comprising the material due to the ability of these groups to suppress polysulfide transport.

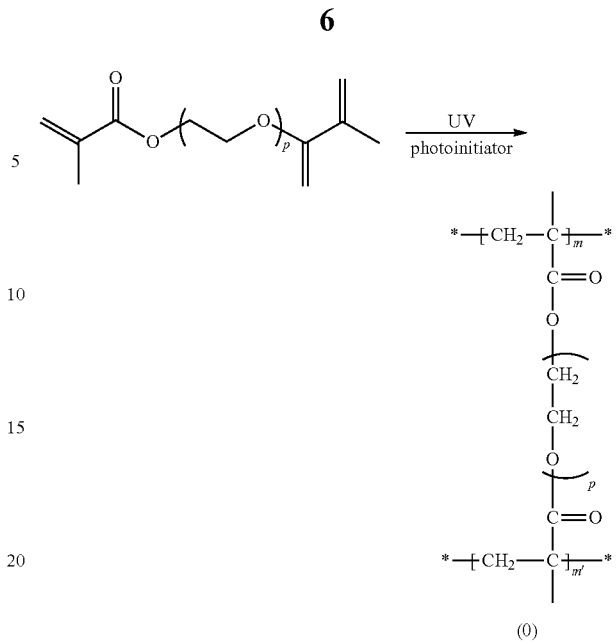

Accordingly, polyethylene glycol di(meth)acrylates (PEG(M)A) can polymerize to form a cross-linked network structure, a portion of an embodiment of which is depicted below, for PEGDMA:

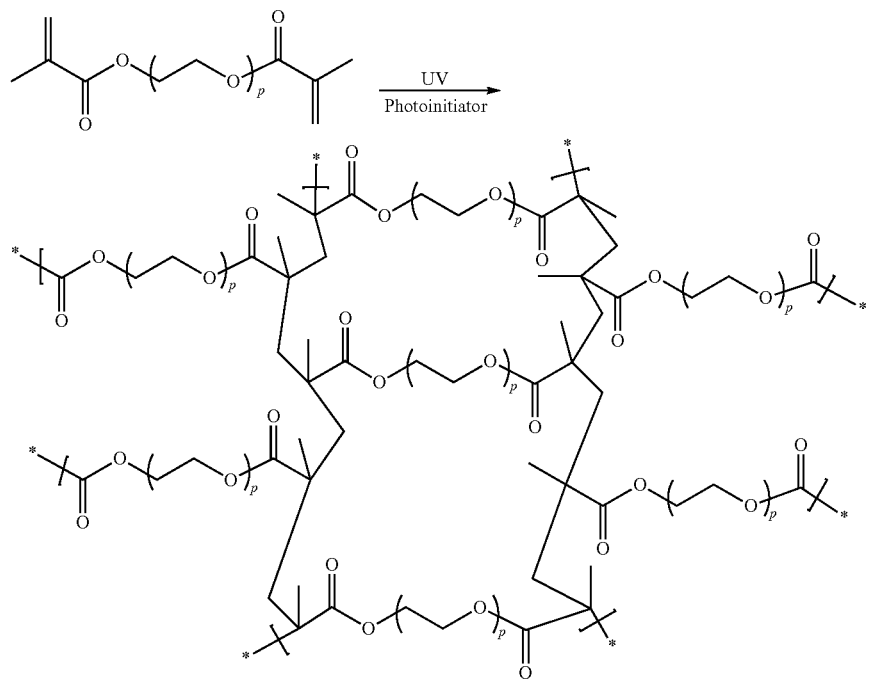

Embodiments of the polymeric material are formed by co-polymerizing polyethylene glycol di(meth)acrylate monomers and sulfonate salt monomers.

When polymerized, acrylate groups of the polyethylene glycol di(meth)acrylate covalently bond to two adjacent units, thereby forming a cross-linked network structure. For example, polyethylene glycol dimethacrylate (PEGDMA) polymerizes to form a PEGDMA unit/residue or formula (0):

However, by copolymerizing with the sulfonate salt, the PEG(M)A-based cross-linked network is disrupted. In particular, during polymerization, the double bonds of the sulfonate salt monomers open to covalently bond to polyethylene glycol di(meth)acrylate units, thereby introducing dangling sulfonate groups into the cross-linked network. As discussed below, introduction of the dangling sulfonate groups into embodiments of the polymeric material has been confirmed (e.g., via Fourier transform infrared spectroscopy). Without being bound by theory, it is believed that the sulfonate salt incorporate within the cross-linked network (bonding to two adjacent units) and/or disrupts a chain within the cross-linked network (bonding to a single adjacent unit). Schemes 1 and 2 below show non-limiting embodiments of polymeric materials resulting from copolymerization of PEGDMA and sodium ethenesulfate. In Scheme 1, the sulfonate salt forms two bonds with adjacent units. In Scheme 2, the sulfonate salt forms one bond with an adjacent unit.

In some embodiments, the polyethylene glycol di(meth)acrylate is polyethylene glycol dimethacrylate.

In some embodiments, the polyethylene glycol di(meth)acrylate is polyethylene glycol diacrylate.

In some embodiments, the polyethylene glycol di(meth)acrylate is a combination of polyethylene glycol dimethacrylate and polyethylene glycol diacrylate.

Scheme 1

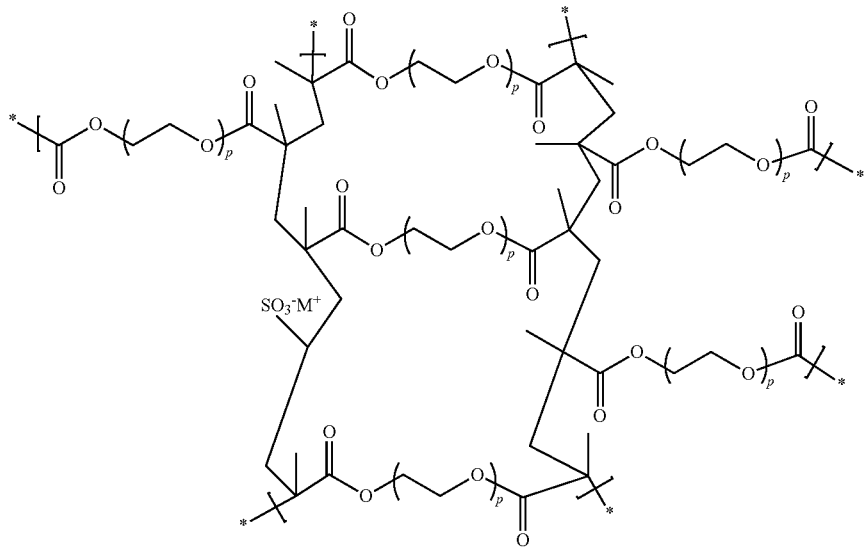

Scheme 2

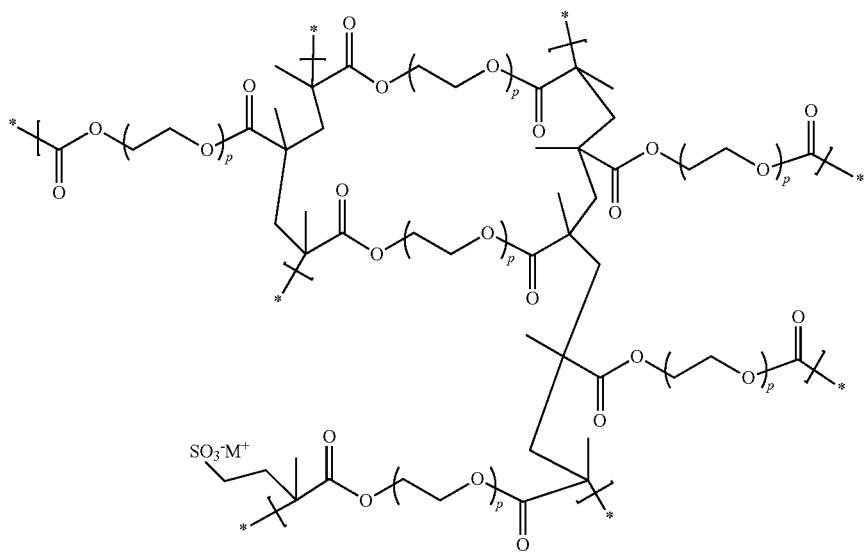

While the embodiments of Schemes 1 and 2 are presented separately, both types of sulfonate incorporation can occur during a single polymerization (with some salt monomers bonding to two adjacent units, and some bonding to one adjacent unit).

The sulfonate salt is a monomer comprising a sulfonate group (e.g., a terminal sulfonate group), and a double bond that facilitates covalent bonding of the sulfonate salt to the polyethylene glycol di(meth)acrylate. Co-polymerization of the sulfonate salt and the polyethylene glycol di(meth)acrylate results in a cross-linked network having dangling sulfonate groups. Persons having ordinary skill in the art are readily able to select appropriate sulfonate salts capable of contributing the dangling sulfonate groups.

In some embodiments, the sulfonate salt is a salt of formula (II):

(II)

wherein:

$R^{2a}$ is selected from hydrogen (H) and methyl (Me);

M is selected from sodium (Na), lithium (Li), aluminum (Al), magnesium (Mg), zinc (Zn), and potassium (K); and A is selected from a bond, phenyl (Ph), —$C_{1-6}$alkyl, —C(O)O$C_{1-6}$alkyl, and —C(O)NH$C_{1-6}$alkyl.

Unless otherwise indicated, where a definition of A is provided, the leftmost portion of the definition indicates the portion of the substituent that is bound to the carbon of the $CR^{2a}$. For example, where A is —C(O)O$C_{1-6}$alkyl, the carbonyl carbon is covalently bound to the carbon ("C") in $CR^{2a}$.

As used herein, "alkyl" is intended to include linear, branched, and cyclic hydrocarbon structures and combinations thereof. "$C_{1-6}$alkyl" refers to alkyl groups of from 1 to 6 (i.e., 1, 2, 3, 4, 5, or 6) carbon atoms. Examples include methyl, ethyl, propyl, isopropyl, butyl, s- and t-butyl and the like.

In some embodiments of the sulfonate salt of formula (II), $R^{2a}$ is H.

In some embodiments of the sulfonate salt of formula (II), $R^{2a}$ is Me.

In some embodiments of the sulfonate salt of formula (II), A is selected from a bond, Ph, $CH_2$, —C(O)O($CH_2$)$_3$—, and —$CH_2$C($CH_3$)$_2$.

In some embodiments, where A is Ph, it is 1,4-phenylene (as for example, in 4-styrenesulfonic acid sodium salt).

In some embodiments of the sulfonate salt of formula (II), A is a bond.

In some embodiments of the sulfonate salt of formula (II), A is a bond and $R^{2a}$ is H.

In some embodiments of the sulfonate salt of formula (II), M is selected from sodium and potassium.

In some embodiments of the sulfonate salt of formula (II), M is sodium.

In some embodiments, the sulfonate salt is selected from sodium ethenesulfonate, 4-styrenesulfonic acid sodium salt, sodium allylsulfonate, 3-sulfopropyl acrylate potassium salt, 2-acrylamido-2-methyl-1-propanesulfonic acid sodium salt, and 2-methyl-2-propene-1-sulfonic acid sodium salt.

In particular embodiments, the sulfonate salt is sodium ethenesulfonate (also known as vinylsulfonic acid sodium salt).

In some embodiments of the inventive polymeric material, cations from the salt are replaced with metal ions selected from sodium, lithium, aluminum, magnesium, and zinc, for example, via ion exchange.

In particular embodiments, cations from the salt (e.g., sodium ions) are replaced with lithium ions.

In some embodiments, the inventive cross-linked polymeric material comprises 50 to 100 mol % (e.g., 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mol %) units from the polyethylene glycol di(meth)acrylate and the sulfonate salt, including any and all ranges and subranges therein.

In some embodiments, at least 50 mol % of the cross-linked polymeric material is made up of the PEG(M)A-based network structure.

In some embodiments, "defects" in the PEG(M)A-based network structure comprise or consist of intentionally-introduced functional groups that are intended to modify the properties of the polymeric material. For example, the material comprises sulfonate dangling groups, which are introduced via the sulfonate salt. The sulfonate dangling groups can be considered as "defects" (albeit intended defects) in the network structure.

In some embodiments, the cross-linked polymeric material comprises 20 to 98 mol % (e.g., 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98 mol %) polyethylene glycol di(meth)acrylate units, including any and all ranges and subranges therein.

In some embodiments, the cross-linked polymeric material comprises 1 to 80 mol % (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 mol %) sulfonate salt units, including any and all ranges and subranges therein.

In some embodiments of the cross-linked polymeric material, the weight ratio of the polyethylene glycol di(meth)acrylate to the sulfonate salt ranges from 10:0.1 to 10:8 (w:w), including any and all ranges and subranges therein (e.g., 10:1.5 to 10:6; 10:2 to 10:5.8, etc.) (For example, in some embodiments the weight ratio of the PEGD(M)A to the sulfonate salt is 10:0.1, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, or 8.0).

In some embodiments, the cross-linked polymeric material comprises 50 to 95 wt % (e.g., 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %) of the polyethylene glycol di(meth)acrylate units, including any ranges and subranges therein (e.g., 55 to 90 wt %, 60 to 85 wt %, 65 to 85 wt %, 70 to 84 wt %, etc.).

In some embodiments, the cross-linked polymeric material comprises 5 to 50 wt % (e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %) of the sulfonate salt units, including any ranges and subranges therein (e.g., 8 to 45 wt %, 10 to 40 wt %, 15 to 35 wt %, etc.).

In some embodiments, the monomers polymerized to form the polymeric material consist of polyethylene glycol di(meth)acrylate and sulfonate salt monomers.

In some embodiments, the cross-linked polymeric material consists of polyethylene glycol di(meth)acrylate and the sulfonate salt.

In other embodiments, the cross-linked polymeric material comprises units from additional monomers. Persons having ordinary skill in the art are familiar with different effects (e.g., membrane properties) that can be achieved by incorporating various functional monomers into polymeric materials. Accordingly, it is contemplated that the inventive polymeric material may also optionally comprise units from monomers besides the PEGD(M)A and sulfonate salt, provided that such additions do not unduly compromise the desired network structure such that the material loses its intended purpose (which may be, in some embodiments, e.g., effective ion-selectivity).

In some embodiments, the cross-linked polymeric material comprises a unit (which may also be referred to as a repeating unit, as it may optionally repeat) of formula (I):

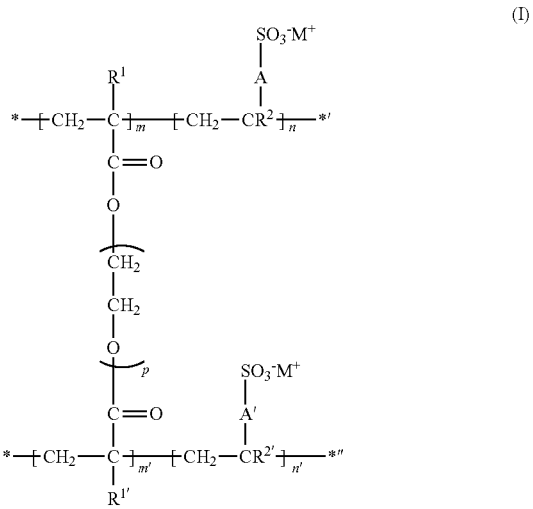

wherein:
$R^1$ and $R^{1'}$ are individually selected from hydrogen (as e.g., in the case of PEGDA) and methyl (as, e.g., in the case of PEGDMA);
$R^2$ and $R^{2'}$ are individually selected from H, Me, H,H and H,Me;
A and A' are individually selected from a bond, Ph, $C_{1-6}$alkyl, —C(O)O$C_{1-6}$alkyl, and —C(O)NH$C_{1-6}$alkyl;
M and M' are individually selected from sodium, lithium, aluminum, magnesium, and zinc;
m and m' are each an integer selected from 1 to 50;
n is an integer selected from 1 to 30;
n' is an integer selected from 0 to 30;
p is an integer selected from 2 to 20;
each * indicates a point of attachment to an adjacent polymer repeating unit; and
*' and *'' indicate a point of attachment to an adjacent polymer repeating unit, or, when $R^2$ or $R^{2'}$ is H,H or H,Me, *' or *'', respectively, is absent.

In some embodiments, $R^1$ and $R^{1'}$ are each H.
In some embodiments, $R^1$ and $R^{1'}$ are each Me.
In some embodiments, $R^2$ is H.
In some embodiments, $R^2$ is Me.
In some embodiments, $R^2$ and $R^{2'}$ are H.
In some embodiments, $R^2$ and $R^{2'}$ are Me.
In some embodiments, $R^2$ is H,H or H,Me. In such embodiments, *' is absent, as the sulfonate salt unit is covalently bound to only one adjacent unit.
In some embodiments, A is a bond.

In some embodiments, A' is present (i.e., n'>0), and A' is a bond.
In some embodiment, A is 1,4-phenylene.
In some embodiments, A is selected from a bond, Ph, $CH_2$, —C(O)O($CH_2$)$_3$—, and —$CH_2$C($CH_3$)$_2$.
In some embodiments, M and M' are individually selected from sodium and lithium.
In some embodiments, $M^+$ and $M'^+$ (where present) are metal ions that have replaced a different cation of the sulfonate salt unit, e.g., via ion exchange. For example, in some embodiments, $M^+$ and $M'^+$ (where present) are $Li^+$, and have replaced, e.g., $Na^+$.

Each of m and m' are an integer selected from 1 to 50 (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50), including any and all ranges and subranges therein. In some embodiments, m is 1.

n is an integer selected from 1 to 30 (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30), including any and all ranges and subranges therein. In some embodiments, n is 1.

n' is an integer selected from 0 to 30 (i.e., 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30), including any and all ranges and subranges therein. In some embodiments, n' is 1. In some embodiments, n' is 0 (i.e., the sulfonate salt unit within the brackets preceding the n' is absent).

p is an integer selected from 2 to 20 (i.e., 2, 3, 4, 5, 6, 7, 8, 9, 10, 11, 12, 13, 14, 15, 16, 17, 18, 19, or 20), including any and all ranges and subranges therein (e.g., 2 to 8). In some embodiments, p is 2. In some embodiments, p is 4-20. In some embodiments, p is 2 or 4-20, including any and all ranges and subranges therein.

In a second aspect, the invention provides a membrane comprising a cross-linked polymeric material according to the first aspect of the invention.

In some embodiments, the membrane is a single, or near-single ion conductor.

In some embodiments, the membrane has a high lithium transference number (e.g., close to 1). Such embodiments are attractive for stabilizing both the cathode and anode of batteries that use metals as anodes and conversion chemistries such as sulfur as cathode.

On the cathode side, a negatively charged membrane with sulfonate groups suppresses soluble polysulfide anion crossover due to the repulsive electrostatic interaction. Thus, some embodiments of the inventive membrane have application in metal sulfur batteries, including, e.g., in lithium-sulfur (Li—S) batteries, sodium-sulfur (Na—S) batteries, magnesium-sulfur (Mg—S) batteries, aluminum-sulfur (Al—S) batteries, etc.

On the anode side, single or near single-ion ion conductors are predicted to be very effective in suppressing metal dendrite growth in a battery that uses a metal as the anode. Essentially, electrolyte with immobilized anions improve the stability of electrodeposition of the metal by avoiding the formation of strong ion concentration gradients near the electrode. This unique characteristic is attractive in applications in all types of lithium metal batteries, including Li—S, Li—O2, Li—CO2, Li—$O_2$/$CO_2$, Li—$I_2$, Li—SO2, Li-intercalation compound (LiCoO2, $LiMn_2O_4$, $Li_{1.2}Ni_{0.15}Co_{0.1}Mn_{0.55}O_2$ (NMC), LiFePO4, $LiNi_{0.8}Co_{0.15}Al_{0.05}O_2$ (NCA) . . . ), their sodium and aluminum metal analogs (e.g. Na—S, Al—S etc.), etc. Thus, embodiments of the membranes disclosed herein are envisioned to be useful in such batteries.

The conductivity of embodiments of the inventive membrane can also be manipulated by varying the content of sulfonate groups incorporated in polymeric material (i.e., in the PEGD(M)A networks) during their synthesis. In e.g., scenarios where M or M' are Li$^+$, this can be explained both in terms of the effect of increased concentration of Li ions present to neutralize the pendant $SO_3^2$ groups and by two more subtle effects that the pendant $SO_{32}$ groups bring to the materials: i) The $SO_3^2$ groups helps to increase the permeability of the membrane, resulting in a higher uptake of the electrolyte; and ii) The $SO_3^2$ groups result in a higher dielectric constant of the membrane and thus, the Li$^+$ dissociation and conduction is facilitated through the membrane.

In some embodiments, the membrane, when saturated with organic solvents 1,3-dioxolane (DOL) and 1,2-dimethoxyethane (DME) at a volume ratio of 1:1, the membrane exhibits ionic conductivity of at least $10^{-4}$ S/cm at room temperature.

In some embodiments, the membrane, when saturated with an organic solvent mixture comprising 1,3-dioxolane (DOL) and 1,2-dimethoxyethane (DME) at a volume ratio of 1:1, said organic solvent mixture additionally comprising a dissolved salt selected from the group consisting of lithium bis(trifluoromethanesulfone) imide (LiTFSI), lithium triflate (LiSO$_3$CF$_3$), lithium chlorate (LiClO4), lithium hexafluoro phosphate (LiPF6), or their sodium or aluminum analogs, the membrane exhibits ionic conductivity of at least $3\times10^{-4}$ S/cm or higher at 25° C.

In some embodiments, the membrane has a conductivity of, e.g., at least 0.5, 1, 2, or $3\times10^{-4}$ S/cm.

Persons having ordinary skill in the art will be able to select a desired membrane thickness based on the intended use of the membrane. In some embodiments, the membrane is about 10 μm to about 500 μm thick (e.g., 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, or 500 μm thick), including any and all ranges and subranges therein (e.g., about 100 to 400 μm thick, about 200 to 300 μm thick, etc.).

In some embodiments, the membrane comprises a material in addition to the cross-linked polymeric material according to the first aspect of the invention. After reading this disclosure, persons having ordinary skill in the art will readily be able to envision additional materials that may be useful in such embodiments of the inventive membrane. For example, in some embodiments, the membrane is a multilayer membrane comprising at least 2 (e.g., at least 2, at least 3, etc.) layers. In some embodiments, the membrane comprises an additional material, and the cross-linked polymeric material is disposed within the membrane so as to isolate the additional material (i.e., to prevent direct contact) from the cathode and/or anode. In some embodiments, the membrane comprises (e.g., as said additional material) Celgard.

In a third aspect, the invention provides a battery comprising the membrane according to the second aspect of the invention.

Persons having ordinary skill in the art will recognize that embodiments of the inventive polymeric material and membrane disclosed herein can advantageously be employed within a wide array of batteries, all of which are intended to be covered by this third aspect of the invention.

In some embodiments, the battery is selected from a metal sulfur battery and a metal anode with a conversion (e.g. $O_2$, $CO_2$, $I_2$) or intercalating material (e.g. LiFePO$_4$), cathode metal battery.

In some embodiments, the battery is a metal sulfur battery selected from an Li—S, Na—S, and Al—S battery.

In particular embodiments, the battery is a Li—S battery.

In a fourth aspect, the invention provides a method of making the cross-linked polymeric material according to the first aspect of the invention, or the membrane according to the second aspect of the invention, said method comprising:
  copolymerizing a reaction mixture comprising polyethylene glycol di(meth)acrylate and a sulfonate salt containing a double bond that facilitates covalent bonding of the sulfonate salt to the polyethylene glycol di(meth) acrylate; and
  performing ion exchange, thereby replacing cations from the salt with metal ions selected from sodium, lithium, aluminum, magnesium, and zinc, and combinations thereof.

In some embodiments, the sulfonate salt is of formula (II) as described above.

Examples

The invention will now be illustrated, but not limited, by reference to the specific embodiments described in the following examples.

Materials and Method

Preparation of the Membranes.

Poly(ethylene glycol) dimethacrylate ($M_n$ 750) (PEGDMA) and vinylsulfonic acid sodium salt solution (VS) (25 wt. % in H$_2$O) were purchased from Sigma-Aldrich. DMSO is a good solvent for both PEGDMA and VS, thus VS water solution was dried in the vacuum oven at 100° C. for 24 h and then dissolved in Dimethyl sulfoxide (20 wt. % in DMSO). PEGDMA was added into the DMSO solution and stirred to form uniform solution. The mixture with an addition of 4% photoinitiator methyl benzoylformate (MBF) was exposed to UV light (VMR UV-AC 115V ~60 Hz 254/365 nm) for 20 mins. After the reaction, the membrane was harvested and washed with water to get rid of unreacted polymer and the solvent DMSO. The ion exchange of $Na^+$ to $Li^+$ is carried out in a solution of 2.0M LiOH in deionized (DI) water at room temperature for 24 h under vigorous stirring, after which the resulting membrane is washed three times with DI water to remove the remaining LiOH. The membrane is then dried in vacuum oven at 100° C. for 24 hours and kept in glove box before use.

Preparation of $Li_2S_6$ Solution for Diffusion Experiment.

$Li_2S_6$ used for the visualization testing and the transference number testing was prepared in a solution process where stoichiometric amounts of elemental sulfur and $Li_2S$ were co-dissolved into DOL/DME, followed by heating at 45° C. with stirring for 18 h.

Characterization:

The membranes were characterized using FTIR spectroscopy by using a Bruke Optics Vertex80v infrared spectrometer with air-sensitive samples tested in a vacuum-evacuated chamber. Melting transition behaviors were studied using a DSC Q2000 (TA instruments). Crystal structure was characterized using Scintag Theta-Theta X-ray Diffractometer (XRD). Thermogravimetric analysis (TGA) was used to determine the content of sulfonate groups and the solvent adsorption ability of the membranes. Morphologies of the membranes were studied using LEO 1550 FESEM (Keck SEM). Mechanical properties of the membranes were investigated by dynamic mechanical analysis (DMA) using a TA instrument DMA Q800. Impedance versus frequency was measured using a Novocontrol N40 broadband dielectric spectroscopy. Ionic conductivity as a function of frequency was also measured with a Novocontrol N40 broadband spectrometer fitted with a Quarto temperature control system. The water content in the membranes was quantified by Karl-Fisher titration (Mettler Toledo™ C20 KF titrator).

Electrochemical Characterization: 2030 coin-type cells were assembled using Lithium metal (0.75 mm. thick, Alfa Aesar) as the anode electrode, the prepared membranes as separator, a cathode with 80% as prepared PEI-CNT/S composite, 10% Super-P Li carbon black from TIMCAL, and 10% poly(vinylidene difluoride) (PVDF, Sigma Aldrich) as binder in an excess of N-methyl-2-pyrrolidone in NMP, and electrolyte of 20 μL 1M lithium bis(trifluoromethanesulfone) imide (LiTFSI) in DOL (1,3-dioxolane):DME (1,2 dimethoxyethane) (v:v=1:1) for each cell. The sulfur loading per electrode is 1.2 mg/cm$^2$. The dried membrane was soaked in the same electrolyte for 24 h before assembling in the cell. Cell assembly was carried out in an argon-filled glovebox (MBraun Labmaster). The room-temperature cycling characteristics of the cells were evaluated under galvanostatic conditions using Neware CT-3008 battery testers and electrochemical processes in the cells were studied by cyclic voltammetry using a CHI600D potentiostat.

Non-Limiting Exemplary Membranes

Figure 1B:
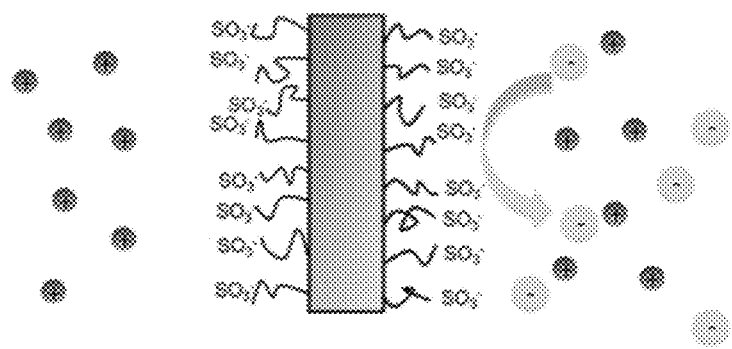

FIGS. 1A, B, and C are simple schematics illustrating operating hypotheses for how Celgard, Nafion, and a cross-linked PEGDMA membrane with dangling sulfonate groups according to an embodiment of the invention, respectively, regulate ion transport. The figures illustrate the operating principle and design of membrane embodiments developed in the study, and compares the hypothesis of how they rectify ion transport by analogy to Nafion and currently used Celgard membranes. As shown in FIG. 1A, when Celgard 2500 (a porous polypropylene polymer film) is used as the membrane/separator in a Li—S cell, both the lithium ion and polysulfides can travel freely between the cathode and anode, resulting in the LiPS shuttling problem. In this case, the separator serves only as an electronic insulator and is not able to influence the ionic transport in the electrolyte. In contrast, when an ion-selective membrane is introduced in the Li—S cell (FIGS. 1B and 1C), the polysulfide diffusion is localized on the cathode side due to the repulsive Columbic interaction between the polysulfide anion and the pendant sulfonate groups covalently anchored to the membrane. In this way, the polysulfide shuttling is suppressed and the reaction between LiPS and lithium metal is prevented. In the specific case of Nafion, the Li conduction is also limited due to the low permeability of Nafion and the low dielectric constant of the membrane backbone.

Figure 1C:
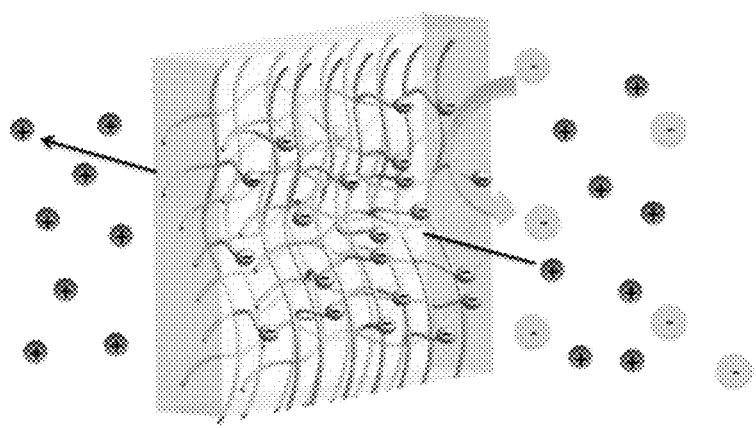
Figure 2:
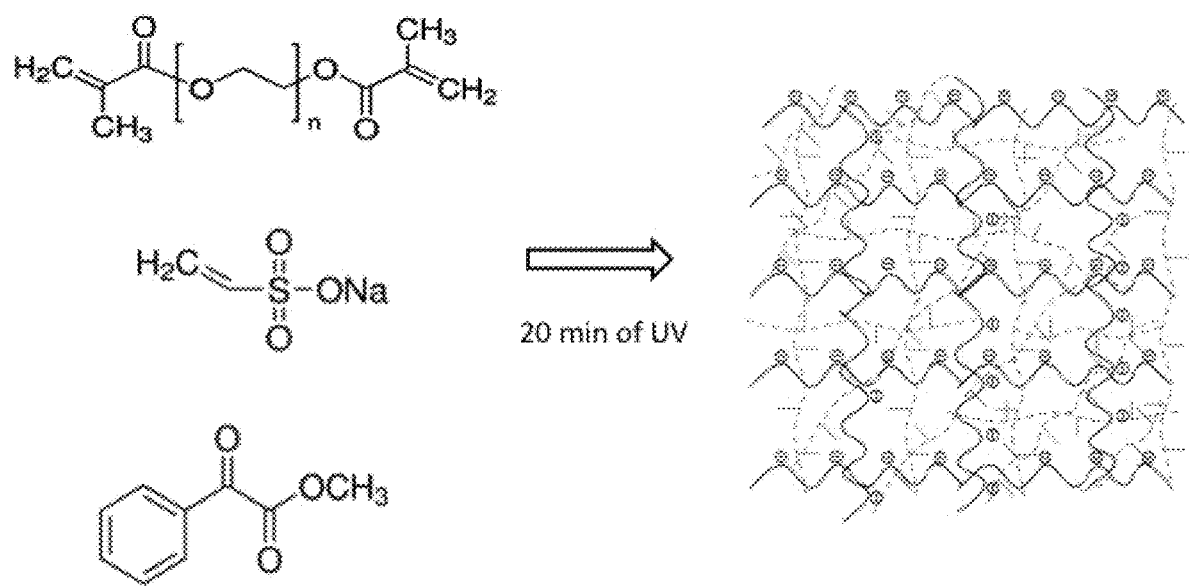
FIG. 2 depicts a preparation process for making an embodiment of a cross-linked material by polymerizing PEGDMA and a vinylsulfonic acid salt, resulting in a material having sulfonate groups.
Figure 3:
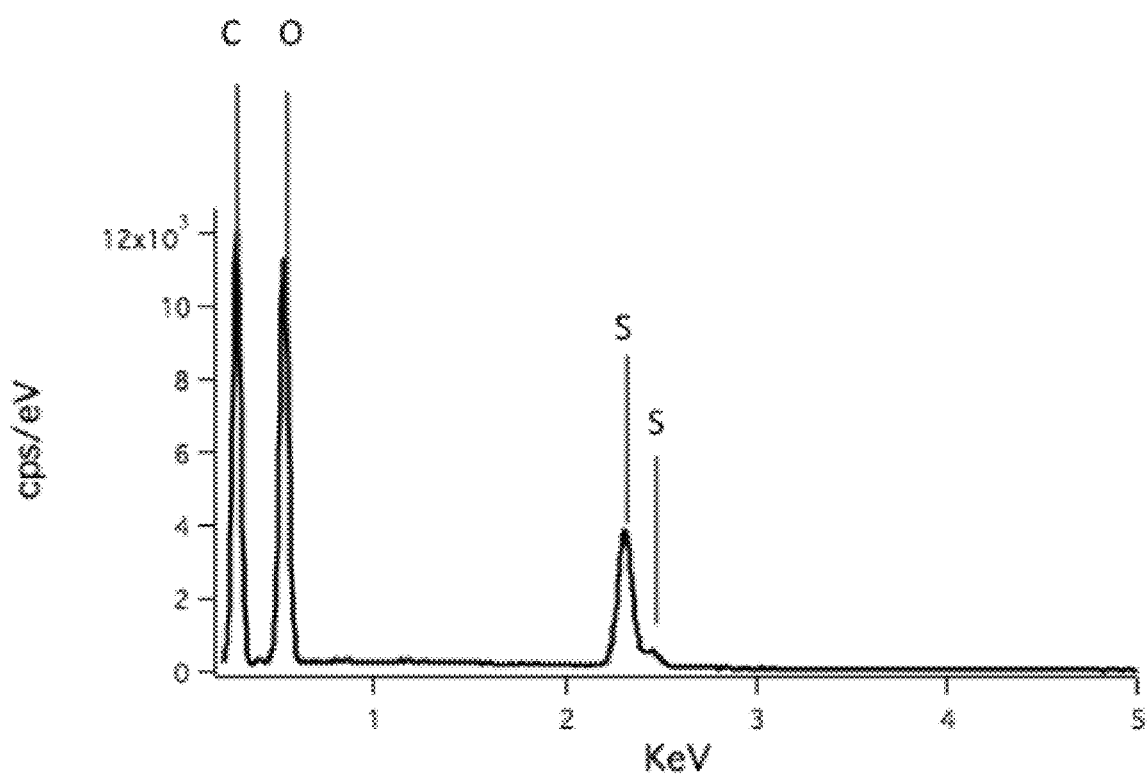
FIG. 3 is an energy-dispersive X-ray spectroscopy (EDX) spectrum of an embodiment of a membrane according to the invention.

An embodiment of the inventive membrane corresponding to the simple illustration of FIG. 1C was made as shown in FIG. 2 by copolymerizing poly (ethylene glycol) dimethacrylate (PEGDMA) and the vinylsulfonic acid salt (VS) (sodium ethenesulfonate) in a weight:weight (w:w) ratio of: PEGDMA:VS=10:2. PEGDMA provides a cross-linked network to which vinylsufonic groups are covalently attached as pendant/dangling entities, which facilitates their availability to solvent and enhances their mobility and dissociation of lithiated sulfonate groups. The PEGDMA and vinylsulfonic acid sodium salt were dissolved in DMSO along with 4% methyl benzoylformate (MBF) which functions as a photoinitiator. The polymerization reaction starts when the solution is exposed to UV light. PEGDMA is chosen due to its ability to form a cross-linked branched network: each PEGDMA chain can covalently link to up to four other PEGDMA chains through radical polymerization in which the acrylate groups participate via an addition reaction. MBF and its derivatives are among the most widely used photoinitiators for radical polymerization of vinyl monomers. Specifically, upon UV excitation, MBF undergoes a fast bond cleavage to generate free radicals and initiates the addition reaction of the double bonds on PEGDMA and VS. This polymerization process is fast, efficient and energy saving. After the reaction, the membrane was harvested and washed with water to get rid of excess unreacted polymer and the solvent DMSO. The membrane was then subjected to lithium-ion exchange to replace sodium ions associated with sulfonate groups (from the VS). The process is carried out by treating the membranes with a solution of 2.0 M LiOH in deionized (DI) water at room temperature for 24 h under vigorous stirring, after which the resulting membrane is washed three times with DI water to remove the remaining LiOH. The successful exchange of Na ion to Li ion is verified by EDX shown in FIG. 3, where no Na signal is observed (the existence of lithium cannot be verified by EDX due to the machine limit). The membranes do not require significant post synthesis processing. They are dried in a vacuum oven at 100° C. and subsequently transferred into the glove box for use. The water content in the membrane was quantified by Karl-Fisher titration. The dried membrane was immersed in DOL/DME electrolyte for one day and the water content of DOL/DME was determined to be ~11 ppm both before and after soaking the membrane.

Figure 4A:
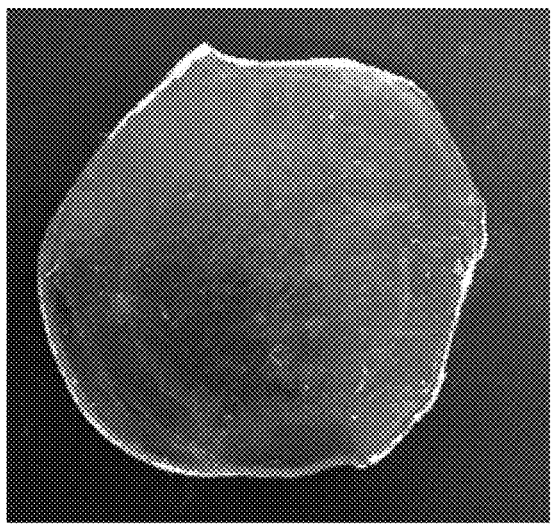
FIGS. 4A-D show the morphology of certain membrane embodiments.
Figure 4B:
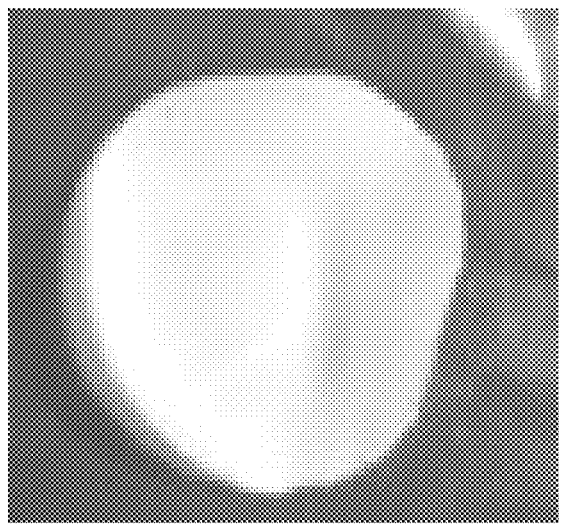
Figure 4C:
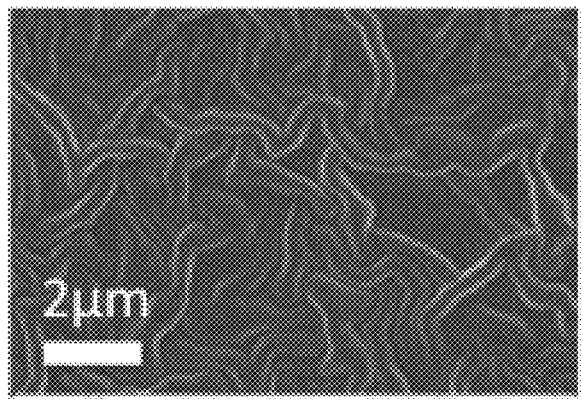
Figure 4D:
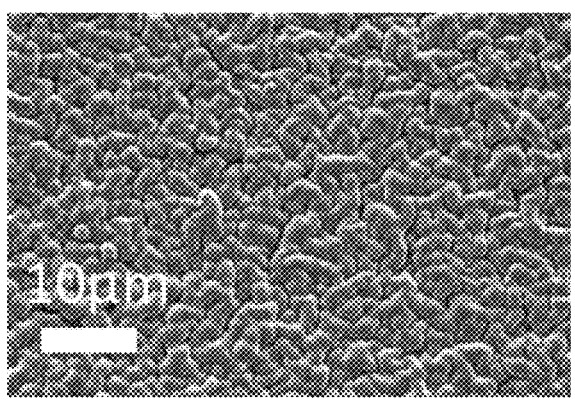
Figure 5A:
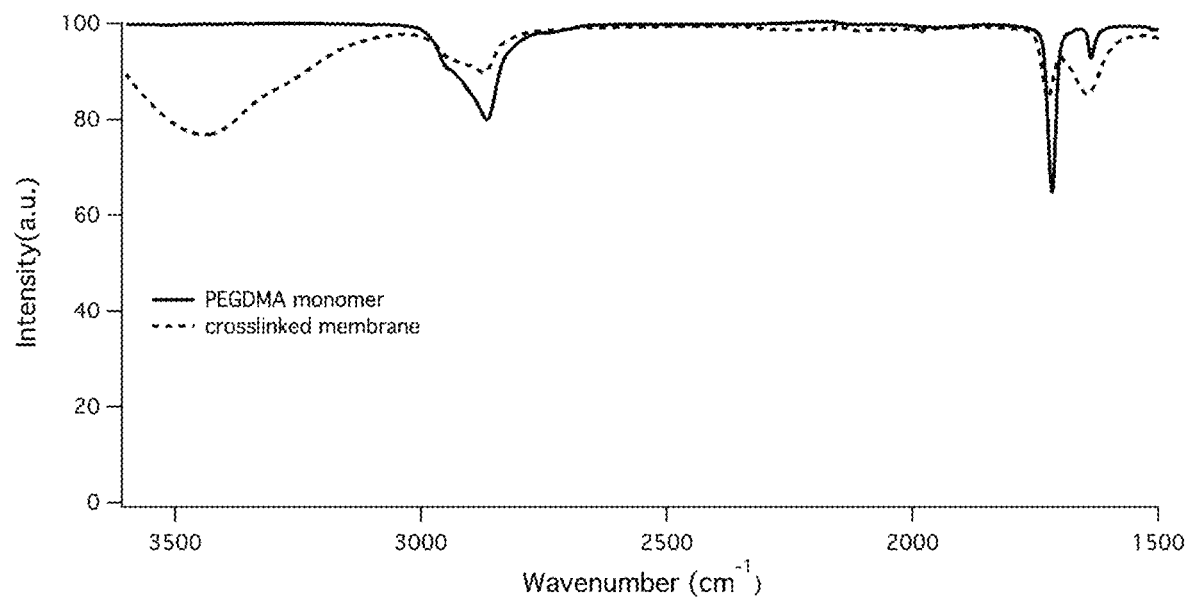
FIGS. 5A and 5B are Fourier transform infrared (FTIR) spectra of embodiments of cross-linked membranes.
Figure 5B:
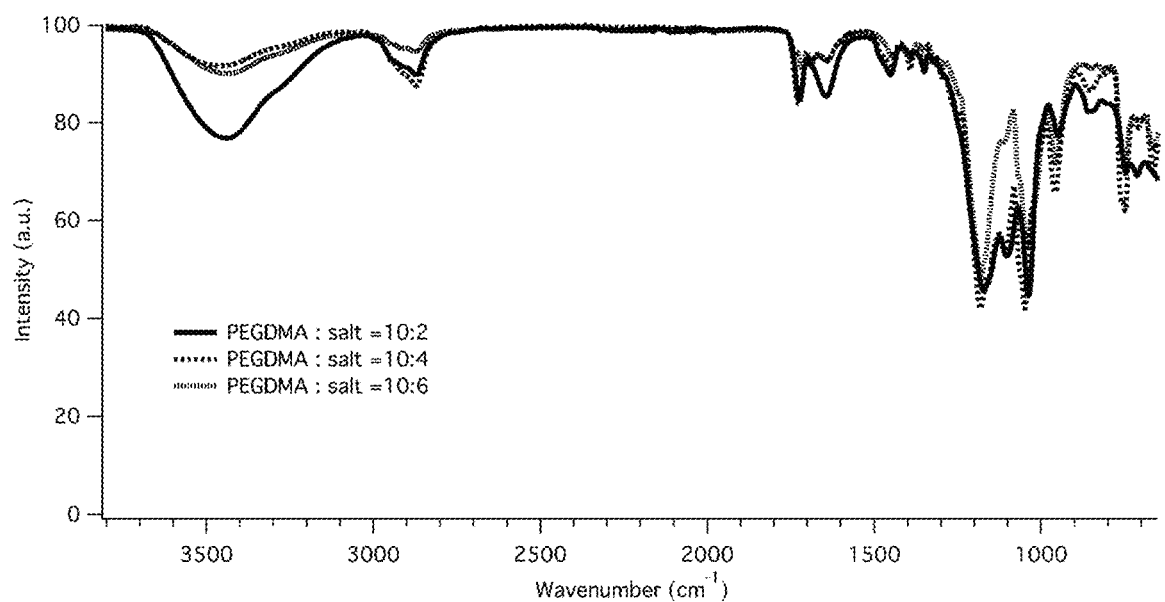

The morphology of the as synthesized membrane embodiment is shown in the photographic image of FIG. 4B. FIG. 4A is a photographic image of a pure cross-linked PEGDMA membrane (prepared according to the above protocol, but without copolymerization with VS, and without subsequent ion exchange). The pure PEGDMA cross-linked membrane shows a transparent and smooth morphology, while the membrane embodiment turns white and soft when VS is incorporated in the polymerization (see FIG. 4B). The SEM images of the membrane (FIGS. 4C and 4D) also provide information about the change in membrane structure and morphology. FIG. 4C is an SEM image of the pure PEGDMA membrane of FIG. 4A. FIG. 4D is an SEM image of the sulfonate group containing membrane of FIG. 4B. The pure PEGDMA membrane has an intercalating structure of the polymer chains/bundles, while when VS is introduced, the bundled crosslink structure is clearly disrupted. Without being bound by theory, it is believed that the disruption is believed to stem from the formation of ionic cross-links between the pendant sulfonate salt and enhanced wetting of the network by solvent. The successful cross-linking of PEGDMA and the incorporation of sulfonate groups by VS is verified by both FTIR and EDX. The FTIR spectra of the PEGDMA functionalized polymer and the PEGDMA-VS cross-linked membrane is shown in FIGS. 5A and 5B. The ratios of PEGDMA to salt (VS) shown in FIG. 5B are weight ratios. As can be seen in FIG. 5A, the untreated PEGDMA monomer has a C=O peak at 1714 cm$^{-1}$. Turning to FIG. 5B, after crosslinking for 20 min under UV exposure, the resulting polymer show C=O peak at 1728 cm$^{-1}$, while the other major characteristic peaks stay the same, which can be explained by the change in the chemical environment in the vicinity of the C=O bond. In PEGDMA monomer, the C=O bonds are conjugated with the adjacent C=C bonds; however when the cross-linking occurs, the C=C bonds are converted to C—C bonds by addition polymerization, thus the C=O bonds are no longer conjugated, resulting in the observed shift in agreement with previous studies.

Figure 6:
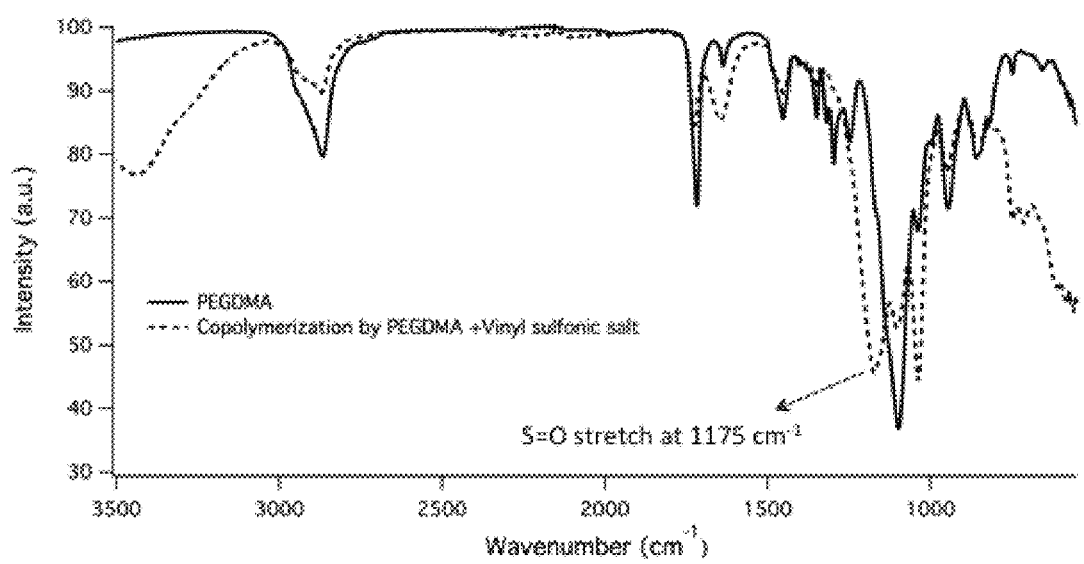
FIG. 6 shows Fourier transform infrared (FTIR) spectra of control PEGDMA and ionomer membrane embodiments created using a UV-cross-linking approach described herein. The results confirm the incorporation of sulfonate groups into the membrane material.

FIG. 6 compares the FTIR spectra of the membranes composed of pure PEGDMA cross-linked membrane and the one with VS incorporated. The FTIR spectra which corresponds to the membrane in which VS is incorporated shows an additional peak at 1175 compared to the pure PEGDMA curve, and it corresponds to the S=O stretch in SO$_3^{2-}$ group. The successful incorporation of sulfonate group and the complete ion exchange of Na$^+$ to Li$^+$ were also verified by EDX on the membrane (see FIG. 3). The elements comprising the membrane were detected by X-rays, which showed the existence of sulfur and the absence of sodium.

Figure 7A:
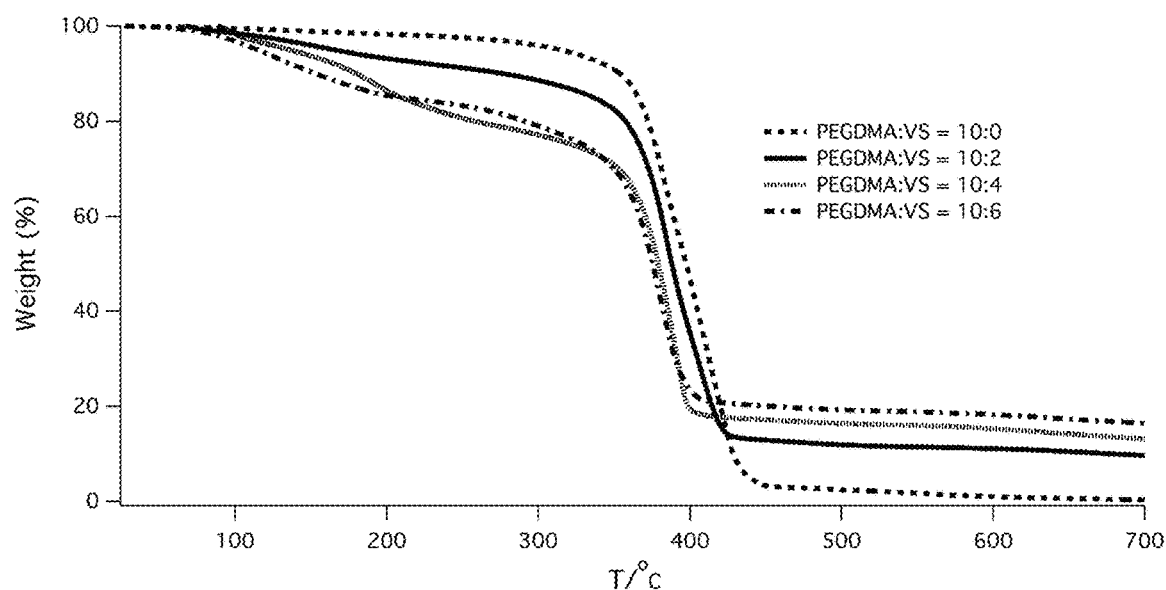
FIG. 7A depicts a thermogravimetric analysis (TGA) curve of cross-linked membrane embodiments with different content of sulfonate groups.
Figure 7B:
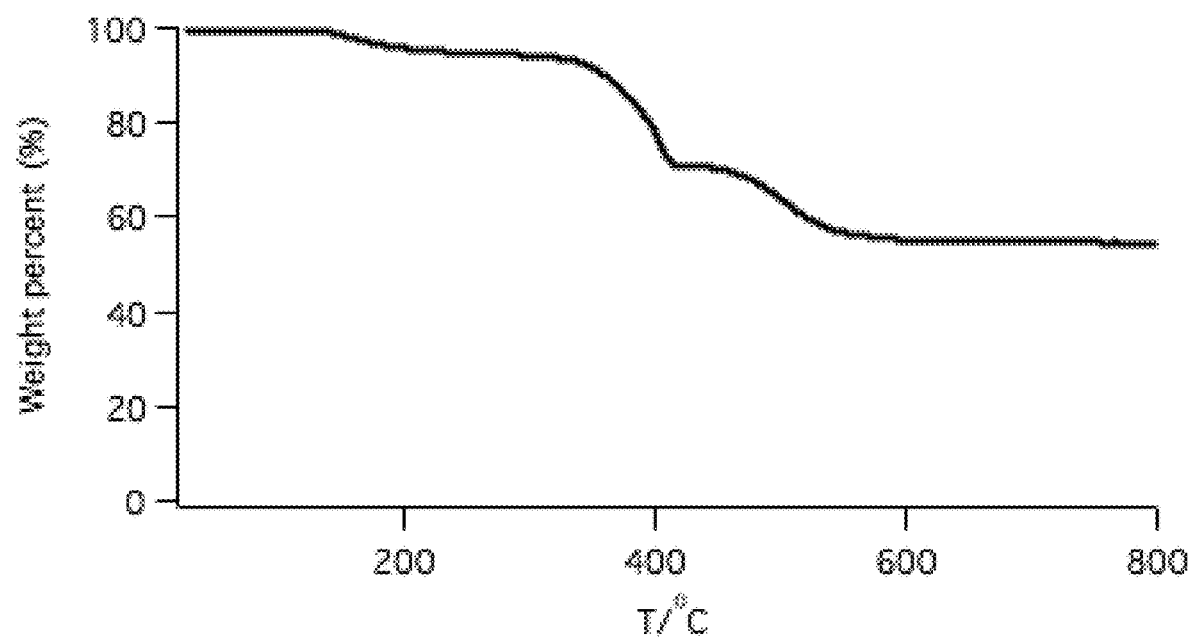
FIG. 7B depicts a TGA of a residue of the monomer salt VS.
Figure 7C:
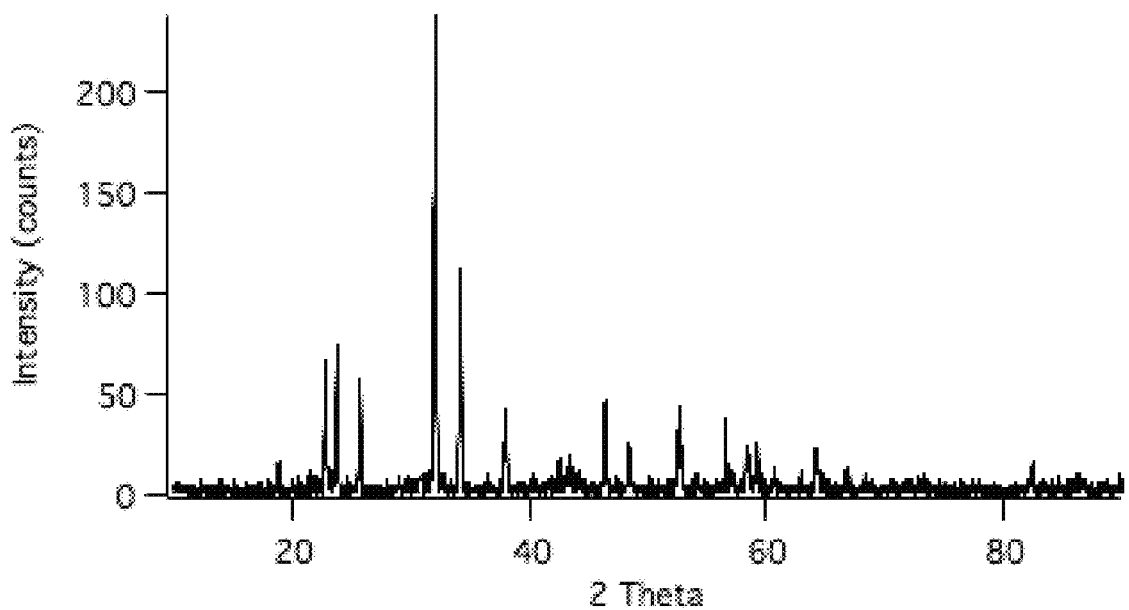
FIG. 7C is an XRD of the residue of FIG. 7B, which shows $Na_2SO_4$ peaks.
Figure 7D:
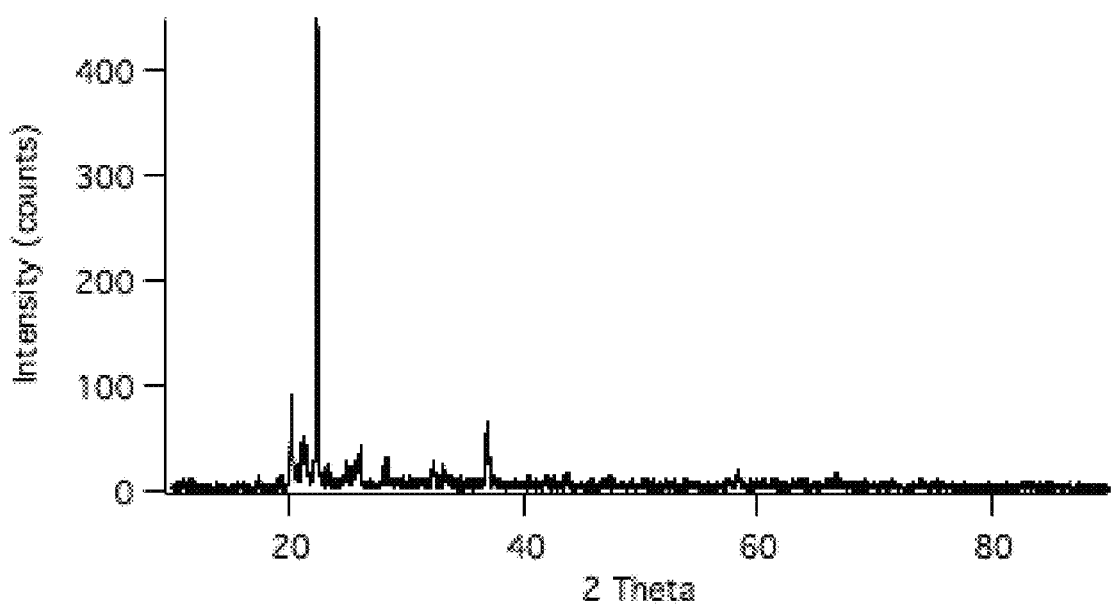
FIG. 7D is an XRD of the residue of FIG. 7A, which shows $Li_2SO_4$ peaks.

The content of sulfonate groups within embodiments of the cross-linked membrane is controlled by the ratio of PEGDMA and VS in the reactants. Membranes with three different PEGDMA/VS ratios (PEGDMA: VS=10:2, 10:4 and 10:6 (w:w)) were prepared and the conductivity, mechanical properties, electrochemical performance as separator in Li—S cell investigated. These membranes will heretofore be identified using the abbreviations PV2, PV4, and PV6, respectively. FTIR spectra confirm that in all cases the sulfonate groups are successfully incorporated in the network and that the SO$_3^{2-}$ functionality of the materials increases in accordance with the increase of residues upon thermal decomposition of the membranes in TGA (see FIG. 7A). FIG. 7B confirms that the residue is metal sulfate salt—the residue is 54% of the original mass of the salt. In addition, the XRD spectra of the residue in FIG. 7C matches well with the standard Na$_2$SO$_4$ peaks. The residue of the sulfonate containing membranes after lithiation was also characterized by XRD and it shows Li$_2$SO$_4$ peaks (FIG. 7D). Thus the SO$_3^{2-}$ content in the membrane was calculated to be 7.1%, 9.3% and 12.5% in PV2, PV4 and PV6 respectively.

Conductivity Testing

Figure 8A:
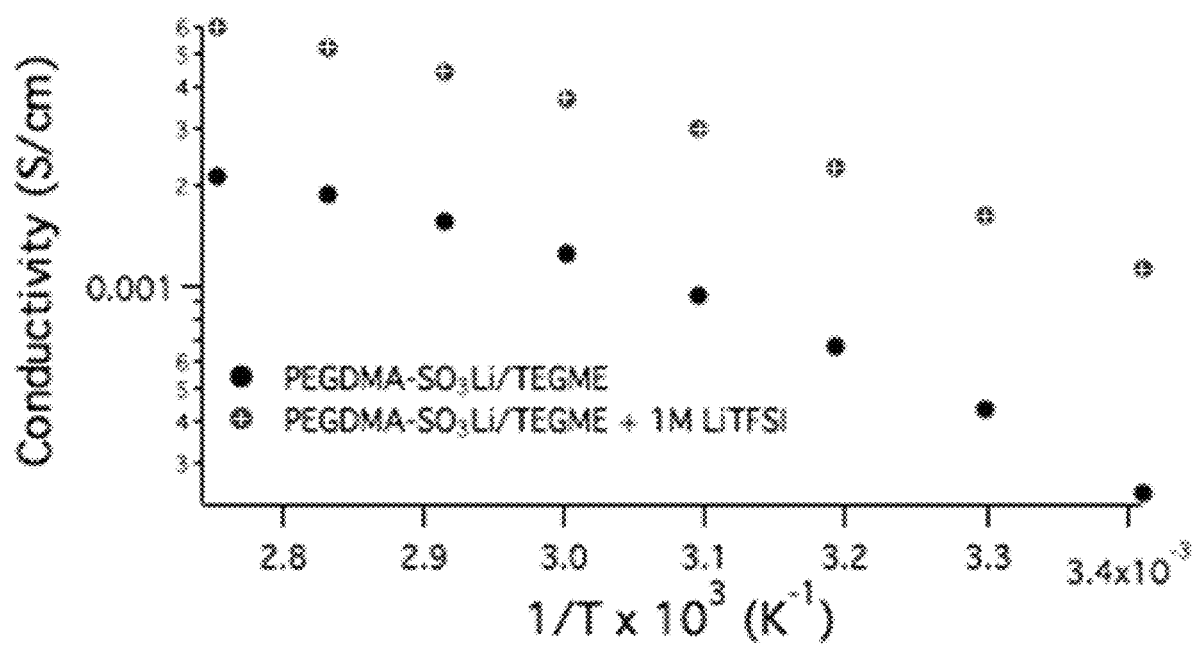
FIG. 8A shows conductivity of a cross-linked membrane embodiment (PEGDMA:VS=10:6) soaked in blank DOL/DME electrolyte and in LiTFSI containing electrolyte.
Figure 8B:
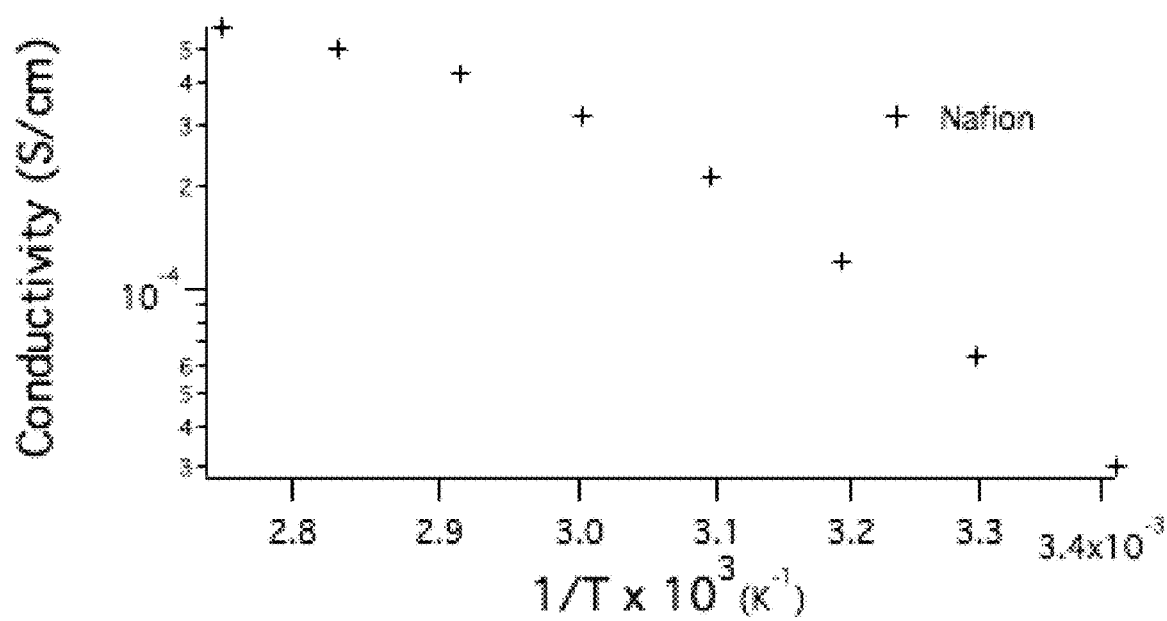
FIG. 8B shows conductivity of Nafion soaked in the same LiTFSI in DME/DOL electrolyte.
Figure 9:
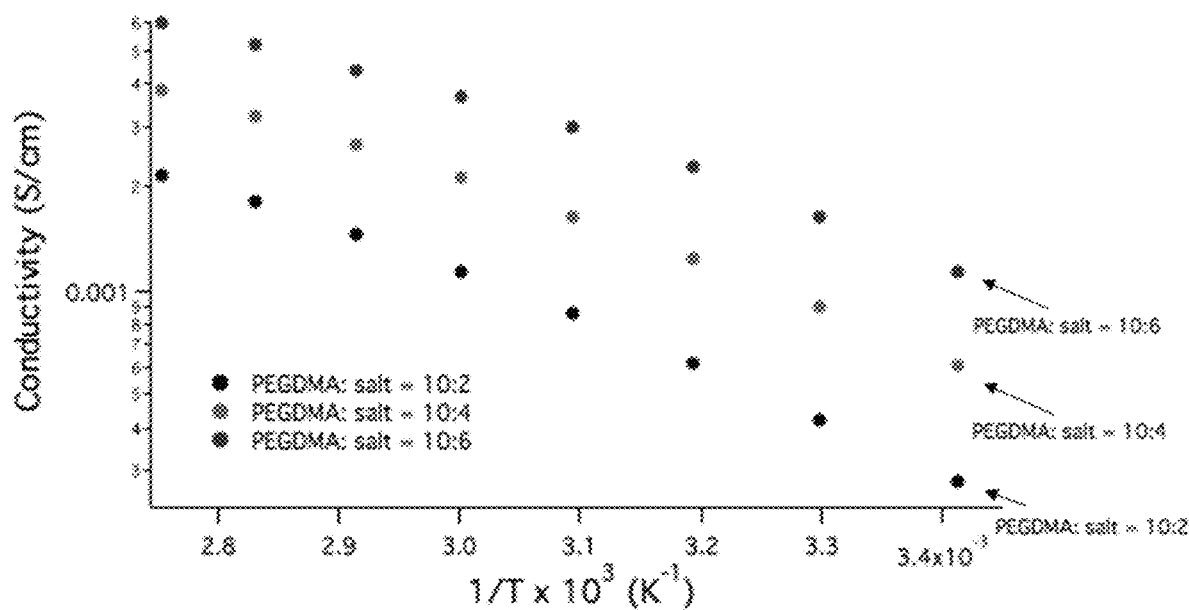
FIG. 9 shows DC ionic conductivity of cross-linked PEGDMA membrane embodiments with different pendant sulfonate group contents.

Conductivity testing was performed on cross-linked membrane embodiments (PEGDMA:VS=10:6) saturated with the organic solvents 1,3-dioxolane (DOL) and 1,2-dimethoxyethane (DME) with a volume ratio of 1:1; a commonly used solvent for Li—S cells. Even without doping with an electrolyte salt, the membranes exhibited high ionic conductivity (~10$^{-4}$ S/cm) at room temperature (FIG. 8A). These conductivity values are among the highest for single-ion conducting materials reported in the literature. Without being bound by theory, it is believed that this feature originates from the dangling chain configuration in which the sulfonate groups are introduced to the network, which simultaneously facilitates access by the electrolyte to promote ion pair dissociation and increases mobility of ions associated with the sulfonate groups. FIG. 9 shows the conductivity of membranes soaked in DOL/DME solvents containing 1M lithium bis(trifluoromethanesulfone) imide (LiTFSI) as lithium salt. The ionic conductivity is seen to reach 10$^{-3}$ S/cm at room temperature (1.14×10$^{-3}$ S/cm at 20° C.), which is at least two orders of magnitude higher than what is possible with Nafion (1.0×10$^{-5}$ S cm$^1$ in DME/DOL containing LiCF$_3$SO$_3$, reported recently). To facilitate more direct comparisons with earlier results from studies utilizing Nafion, the conductivity of Nafion soaked in 1M LiTFSI in DME/DOL was studied (FIG. 8B). Consistent with the literature, these experiments demonstrate an ionic conductivity of 3.05×10$^{-5}$ S cm$^{-1}$ at 20° C., which is substantially lower than what one can achieve with membrane embodiments of the current invention.

Figure 10A:
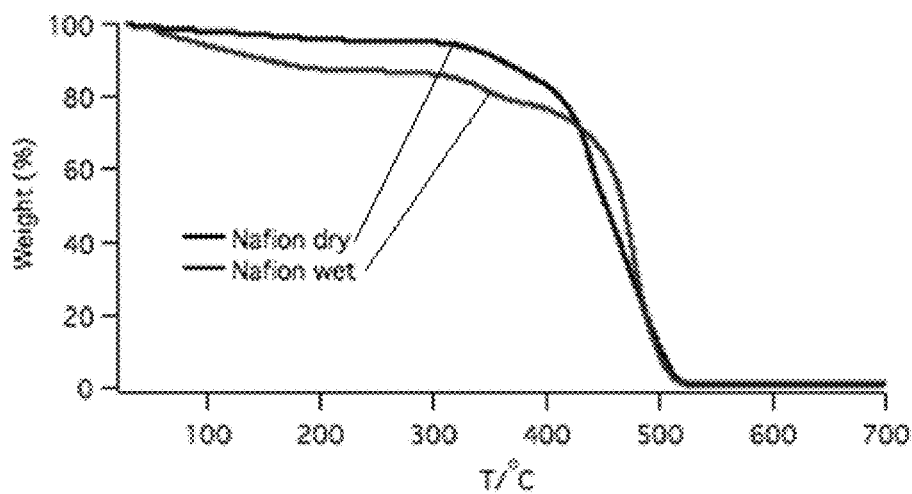
FIGS. 10A-C are TGA curves of membranes soaked in blank DOL/DME electrolyte: (10A) Nafion (10B) PEGDMA:VS=10:0 (10C) PEGDMA:VS=10:6.
Figure 10B:
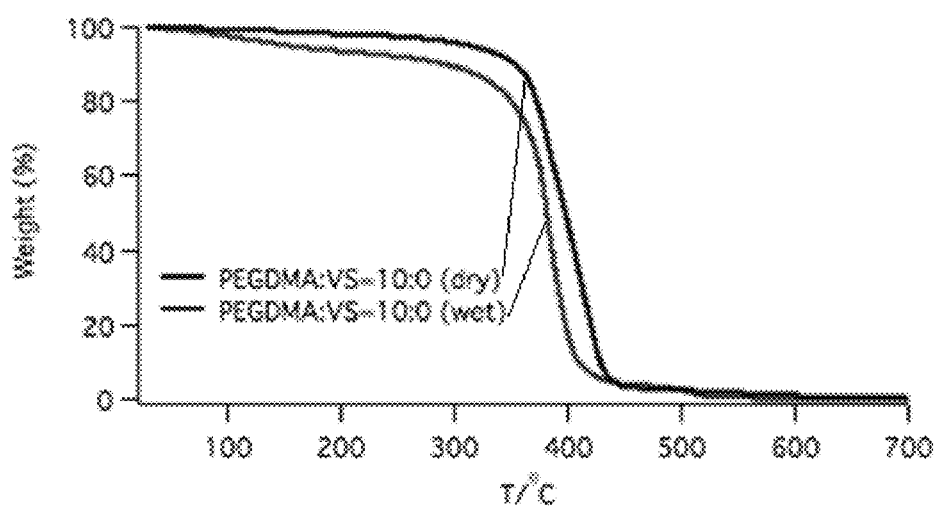
Figure 10C:
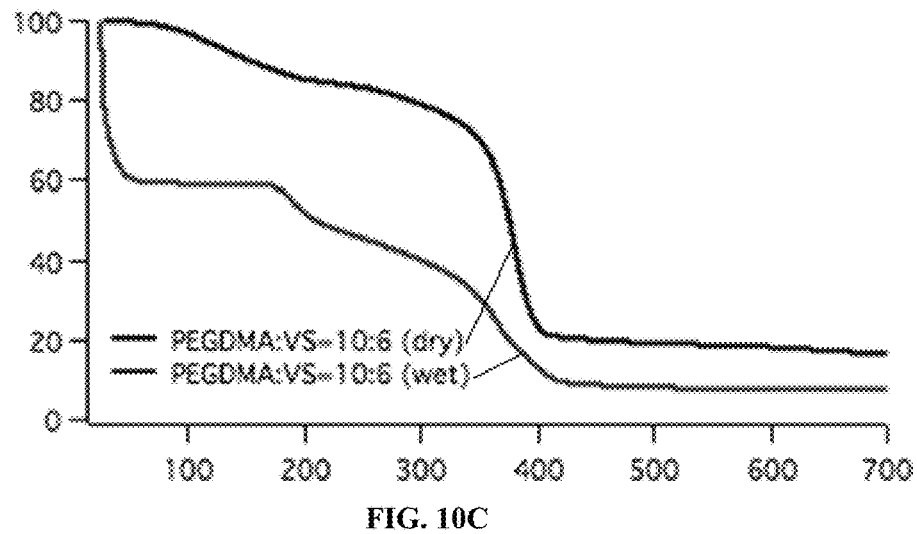
Figure 11A:
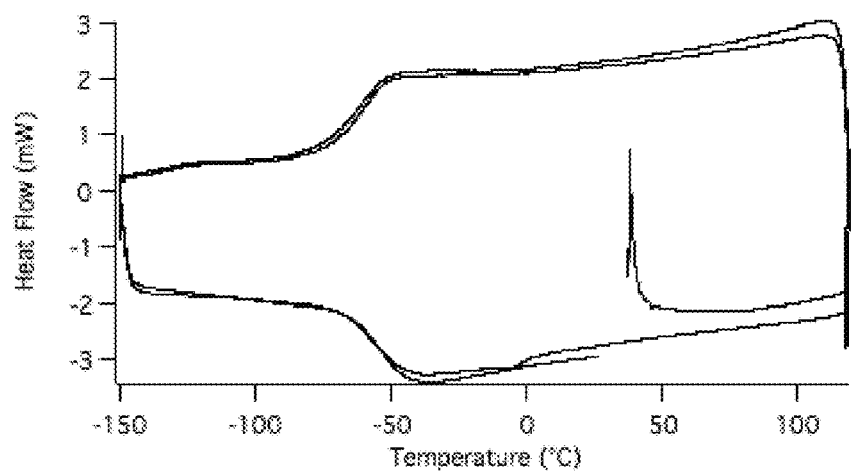
FIGS. 11A-E show results of differential scanning calorimetry (DSC) measurements carried out on different membrane embodiments to determine the effect of pedant sulfate groups on thermal properties of the membranes.
Figure 11B:
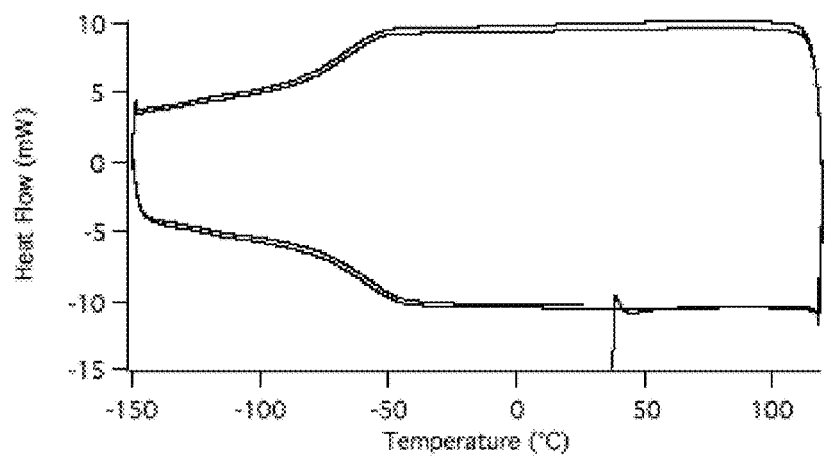
Figure 11C:
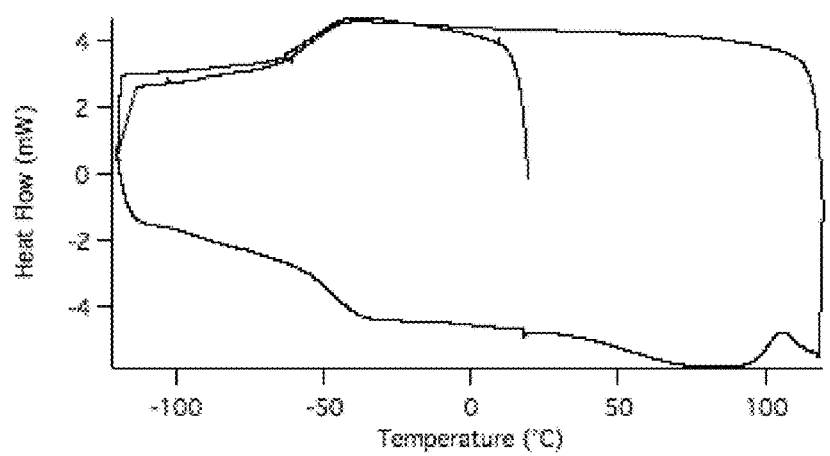
Figure 11D:
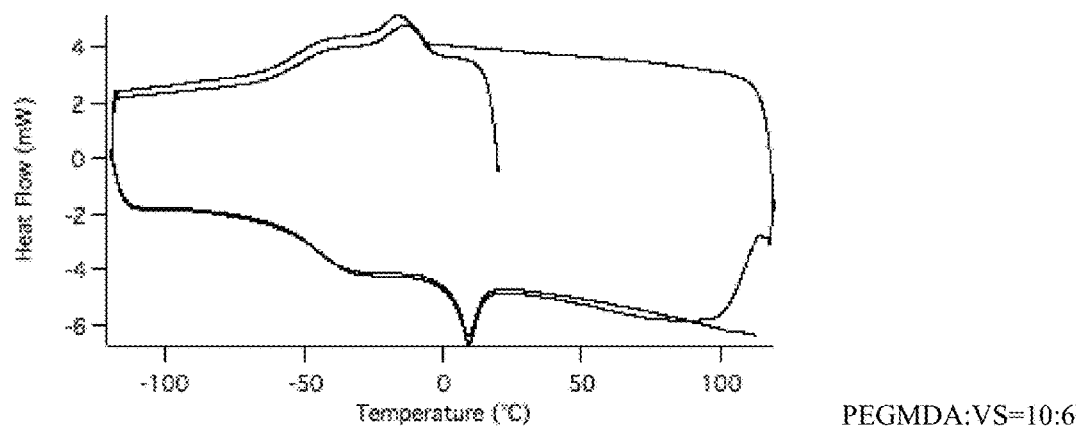
Figure 11E:
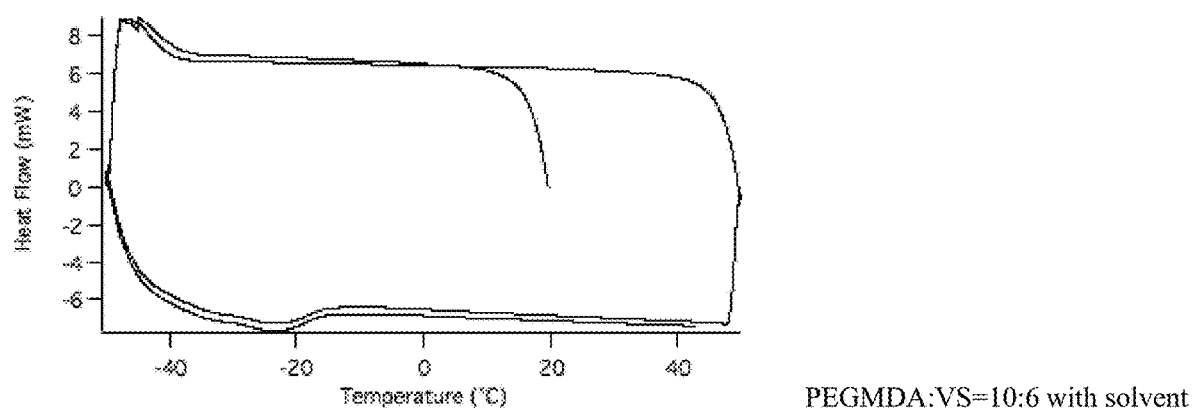
Figure 12:
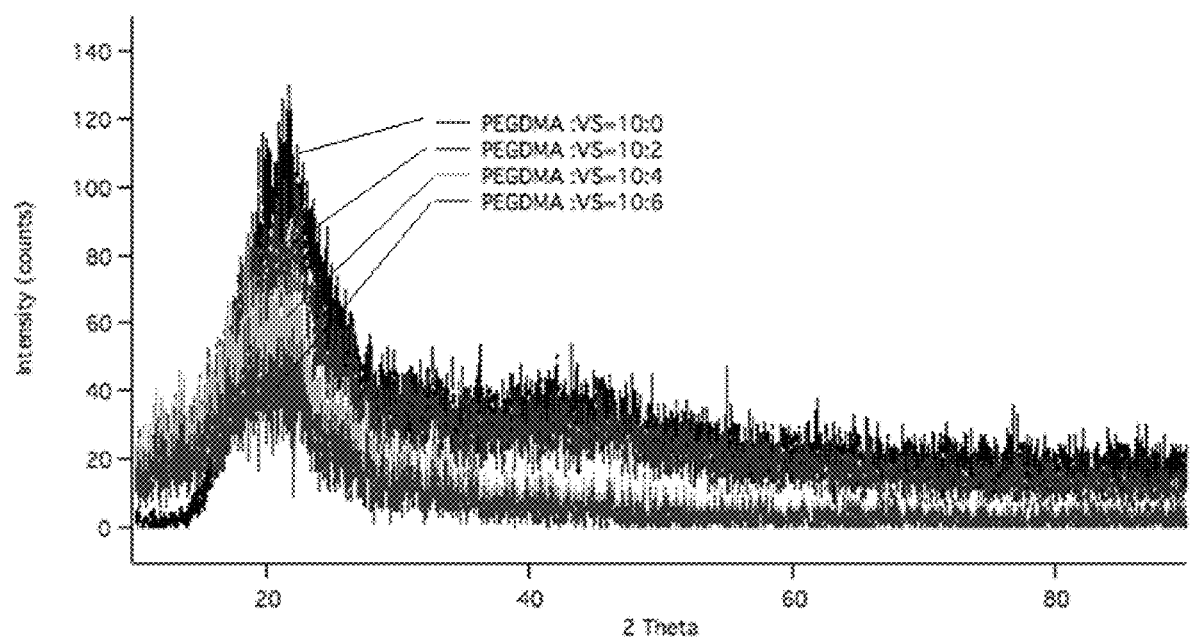
FIG. 12 depicts XRD spectra of membranes embodiments at room temperature.

As mentioned above, the conductivity of the membrane embodiments can be manipulated by varying the content of sulfonate groups incorporated therein. The enhanced wettability of the membranes has been confirmed via TGA. As shown in FIG. 10, the PEGDMA:VS=10:6 membrane before and after immersion in (DOL/DME with v:v=1:1) increases in weight by as much as 40%, which is about four times the electrolyte uptake of Nafion. Differential scanning calorimetry (DSC) measurements were also carried out to determine the effect of the pendant ionic groups on thermal properties of the membranes (see FIG. 11). The results show that for PV2 and PV4 with 7.1%, 9.3% sulfonate groups incorporated in the polymer network, respectively, the $T_g$ values lie well below room temperature (~−50° C.--60° C.) and no detectable melting point was observed within the temperature range investigated. This means that during battery operation at room temperature or higher, the polymer is outside the glassy regime and is non-crystalline, which normally facilitates lithium ion conduction. In contrast, for the PV6 membrane with 12.5% pendant sulfonate, a melting transition is clearly observed at around 10° C., which is attributed to the aggregation and crystallization of neighboring ionic groups in the network. Evidence in support of this includes the complete disappearance of any crystallinity in membranes soaked in the solvent (DOL/DME). The XRD spectra (FIG. 12) also confirms the absence of crystallinity in the swollen membranes at room temperature.

Polysulfide Anion Permeability Testing

Figure 13:
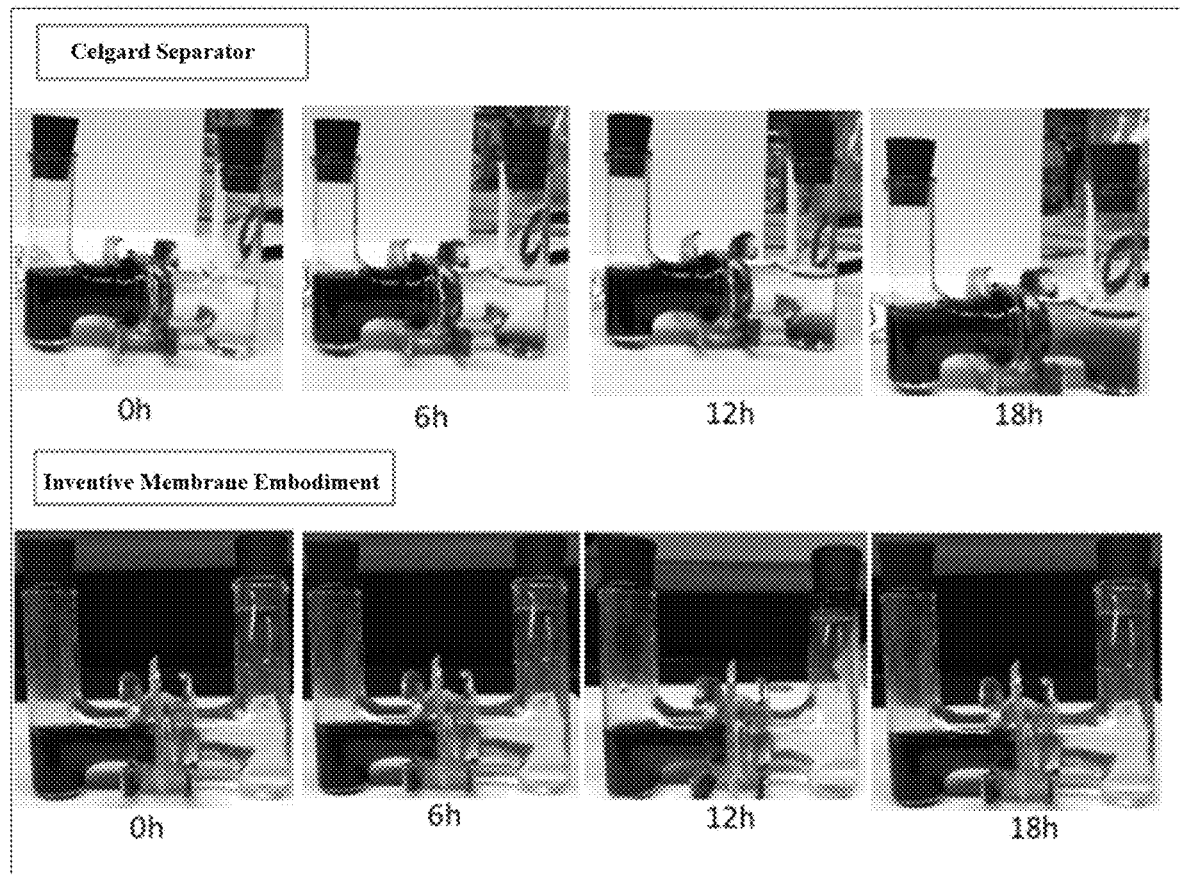
FIG. 13 shows direct visualization LiPS transport testing underway for different membranes.

Due to the pendant sulfonate groups therein, embodiments of the inventive membranes advantageously suppress polysulfide transport. Polysulfide anion permeability is investigated using a visual approach that relies on the intense reddish color changes produced by these ions even at small concentrations in solution. To assess the transport of LiPS through the membranes, an H-shaped liquid cell was employed in the following configuration. Half of the cell was filled with 10 mL blank DOL/DME solvent and another half with 0.5M Li$_2$S$_6$ in 10 mL DOL/DME solvents. These two parts were connected by either a routine Celgard separator FIG. 13, top row) or the inventive PEGDMA:VS=10:6 (PV6) membrane embodiment. The color change of the electrolyte over time was recorded by camera at intervals of 6 h and is shown in FIG. 13. This is one of the most straightforward ways to observe and track the diffusion of LiPS through the membrane by observing the reddish color of LiPS in electrolyte. Over time it is obvious that the LiPS in contact with the Celgard separator diffuses across the separator to the other side of the cell, and this is reflected in the color change of blank DOL/DME electrolyte from clear to reddish. In comparison, the blank electrolyte in the case of ion-selective membrane stays transparent, indicating that very little if any LiPS is able to travel through the sulfonate containing membrane embodiment according to the invention.

Besides the direct visualization of the LiPS diffusion, the ability of the ion-selective membrane to suppress polysulfide anion diffusion was also verified by a quantitative parameter, $t_{Li}^+$ within an electrochemical cell. For this purpose, a lithium symmetric cell was assembled with two lithium metal pieces as electrodes and DOL/DME solvents containing 0.5M LiPS in DOL/DME as electrolyte. The transference numbers were estimated using the conventional Bruce and Vincent method.

$$t_{Li^+} = \frac{I^S(\Delta V - I^0 R_1^0)}{I^0(\Delta V - I^S R_1^S)}$$

Figure 14A:
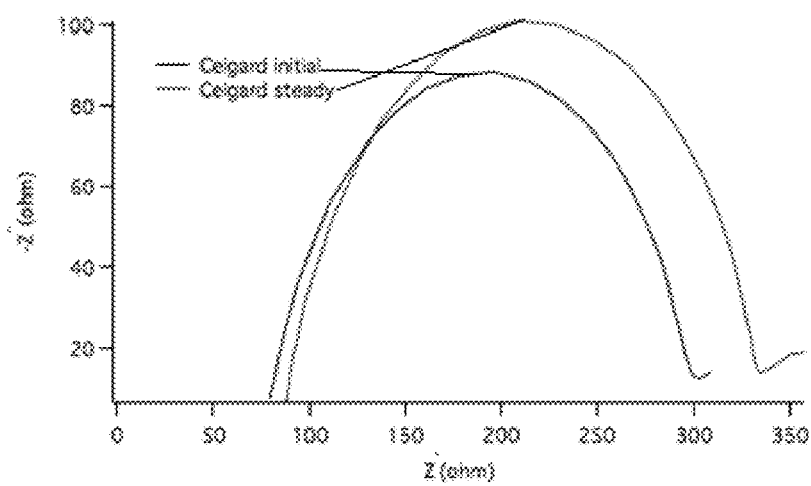
FIGS. 14A-D show transference number measurements, particularly, impedance before and after polarization of (14A) Celgard membrane and (14C) PV6. Polarization profiles of (14B) Celgard membrane and (14D) PV6 are also shown.
Figure 14B:
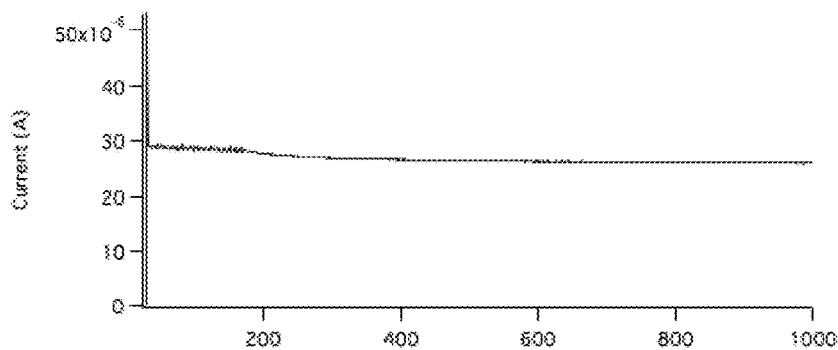
Figure 14C:
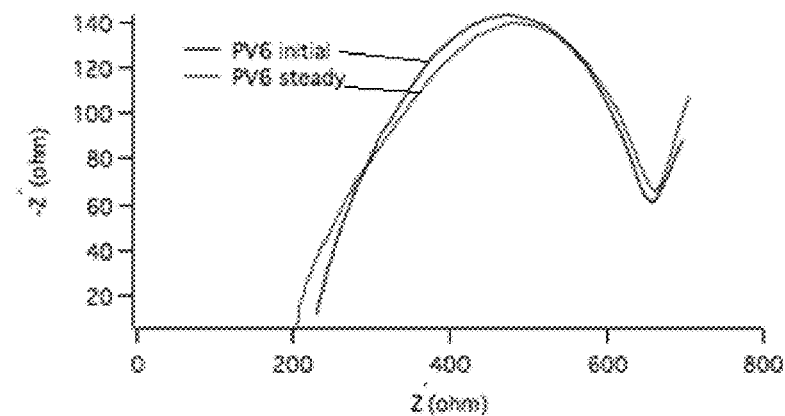
Figure 14D:
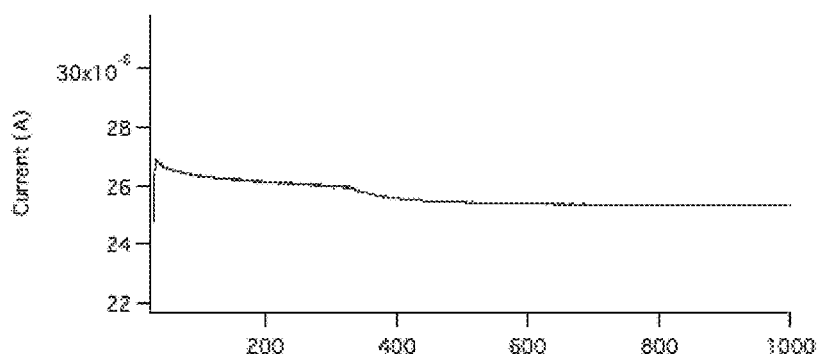

A small $\Delta V=20$ mV is applied to the cells of FIG. 13, and the result is shown in FIG. 14, which shows the impedance and current change before and after polarization of the cell with Celgard separator (FIGS. 14A and 14B) and PV6 (FIG. 14C and FIG. 14D). While the impedance increases after polarization in both cases, the current drop in the cell with Celgard separator is much more dramatic than that with PV6. Using the equation for $t_{Li}^+$ shown above, the transference number of the cell with Celgard is 0.29 while the one with PV6 is as high as 0.98, which is very close to unity, indicating that the ion conduction is mostly via Li$^+$ while polysulfides are unable to diffuse through the separator due to electrostatic interaction, consistent with the visualization experiment shown in FIG. 13. Similar measurements were performed for lithiated Nafion using the same electrolyte and LiPS concentration and obtained $t_{Li}^+=0.96$, which is consistent with a previous study on using Nafion in Li—S cells. In order to determine whether this impressive ion rectification ability of both the inventive cross-linked PEGDMA embodiment and lithiated Nafion membranes is unique to the LiPS species, we also measured $t_{Li}^+$ in electrolytes containing LiTFSI as the only salt using the same procedure. The results for Celgard, Nafion, and PV6 are 0.32, 0.97 and 0.96 respectively, indicating the effective anion immobilization in these membranes.

Figure 15A:
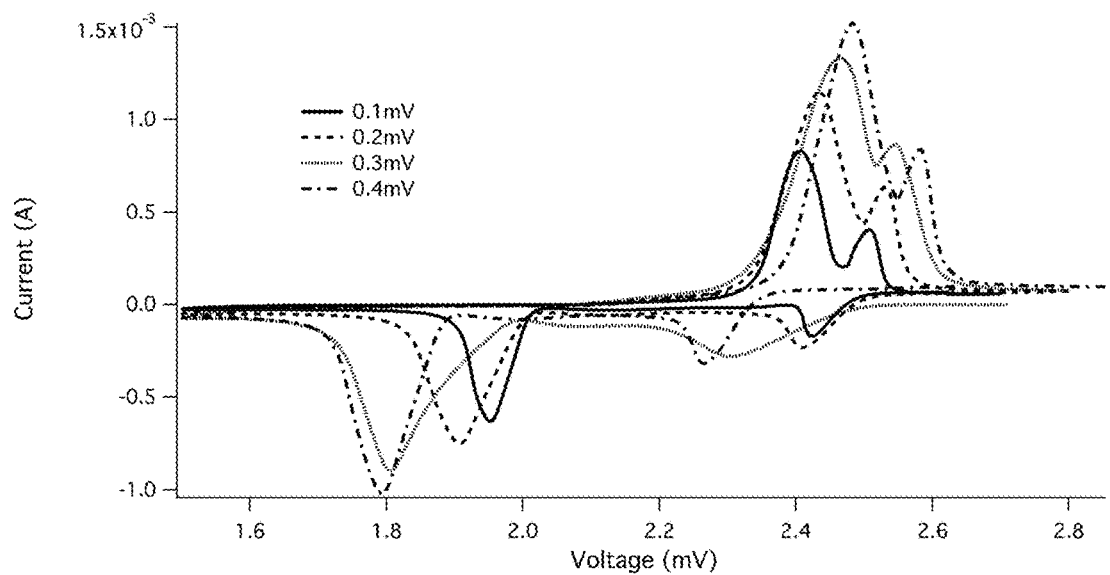
FIGS. 15A and 15B show CV of Li—S cells at different scan rates with 15A being Celgard membrane and 15B being PV6.
Figure 15B:
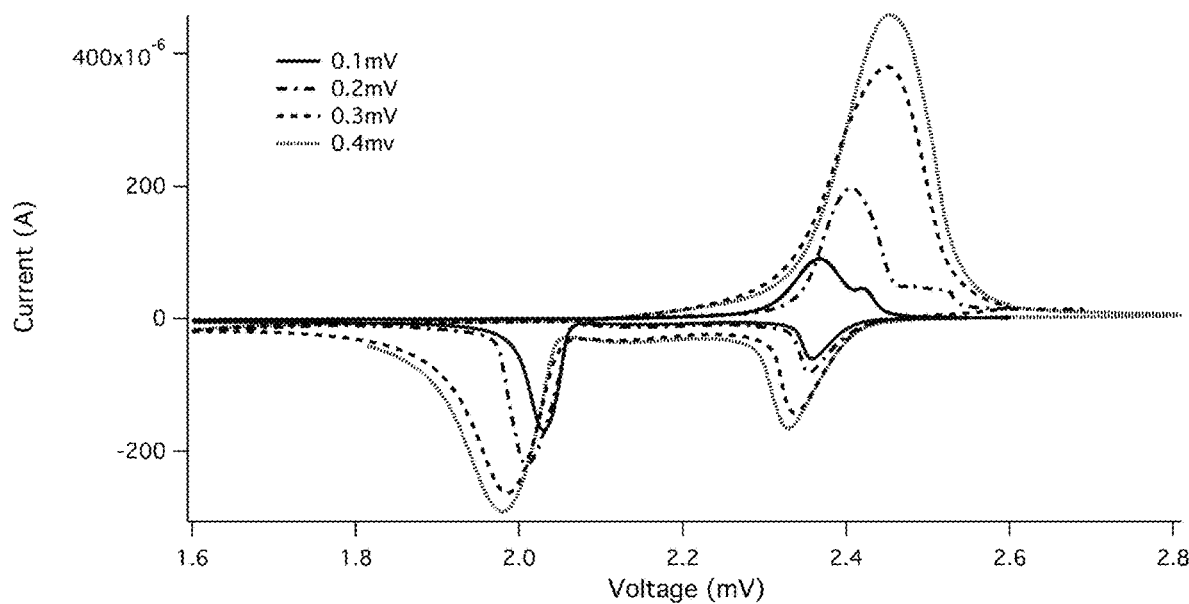

The effect of the membranes on lithium ion diffusion was even more rigorously investigated using cyclic voltammetry (CV). Specifically, the lithium ion diffusion coefficient was evaluated by CV scanning with different scan rates and with the help of Randles-Sevick equation, $$i_p = 268600 n^{1.5} A D^{1.5} C v^{0.5},$$

where $i_p$ is the peak current, n is the number of electrons transferred in the redox reaction, A is electrode area, D is the diffusion coefficient, C is the concentration of ions and v is the CV scan rate. Thus the diffusion coefficient can be calculated from the slope of the line $i_p$ vs. $v^{0.5}$. FIGS. 15A and 15B show the CV curves of Li—S cells with Celgard and PV6 as separator respectively at different scan rates. Table I below summarizes the diffusion coefficients of lithium ion calculated using the redox peaks by using the method above. The lithium ion diffusion in PV6 is close to that of Celgard, indicating the lithium ion is as mobile in the inventive membrane embodiment as in membranes without pendant sulfonate groups, which means that the rectifying effect is specific to the anions.

TABLE I

| Diffusion coefficient of lithium ion of the redox peaks in Li—S cells | | |
|---|---|---|
| $D_{Li}$ (cm$^2$/s) | Celgard | PV6 |
| 1$^{st}$ reduction peak (>2.2 V) | 1.71874E−08 | 1.70542E−08 |
| 2$^{nd}$ reduction peak (<2.0 V) | 2.28979E−08 | 1.22987E−08 |
| Oxidization peak | 3.36873E−07 | 2.17528E−07 |

Li—S Separator Testing

Figure 16A:
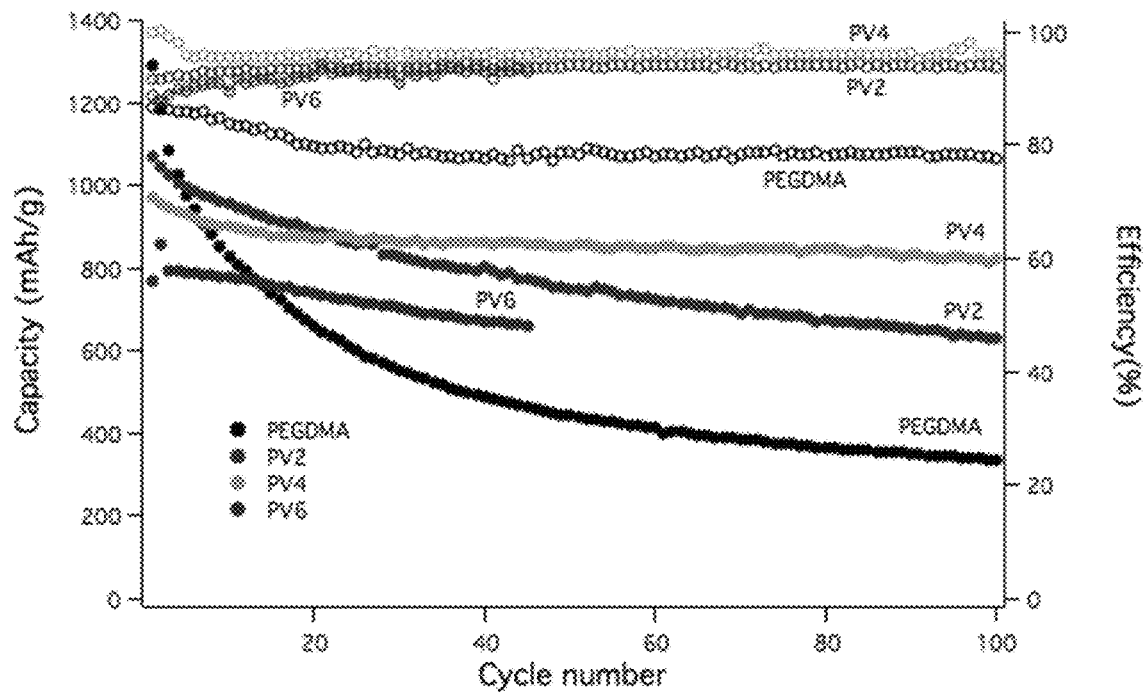
FIGS. 16A and 16B show data for electrochemical characterization and cycling performance. In particular.

The cross-linked PEGDMA membrane embodiments with pendant sulfonate groups were tested as separators in Li—S cells. The sulfur cathode used in these experiments is a Li—S composite reported previously, in which sulfur was infused in a CNT matrix functionalized with polyethylenimine (PEI) (Ma, L. et al., ACS Nano, 2016, 10 (1), pp 1050-1059). For these studies, a single salt electrolyte with 1M LiTFSI in DOL/DME (v:v=1:1), without LiNO$_3$ additive, is used to understand the effect of the membranes. The black PEGDMA curve in FIG. 16A corresponds to the cell with pure PEGDMA crosslinked membrane (the control used for these experiments). Severe capacity fading is observed over cycling with less than 400 mAh/g at 100th cycle, and it should be due to the LiPS shuttling or even the trapping of LiPS in the oxygen-rich membrane, which can interact with the LiPS species. In addition, the Coulombic efficiency of the cell is relatively low, ~78%, indicating there is LiPS shuttling during cycling, resulting in passivation of lithium metal anode and the loss of active materials. However, as can be seen, once the sulfonate group is incorporated into the membrane, the cycling becomes much more stable. Moreover, the Coulombic efficiency reaches 96%-97% when sulfonate group is present, further confirming its ability to localize LiPS diffusion near the cathode side.

Mechanical Testing

Figure 16B:
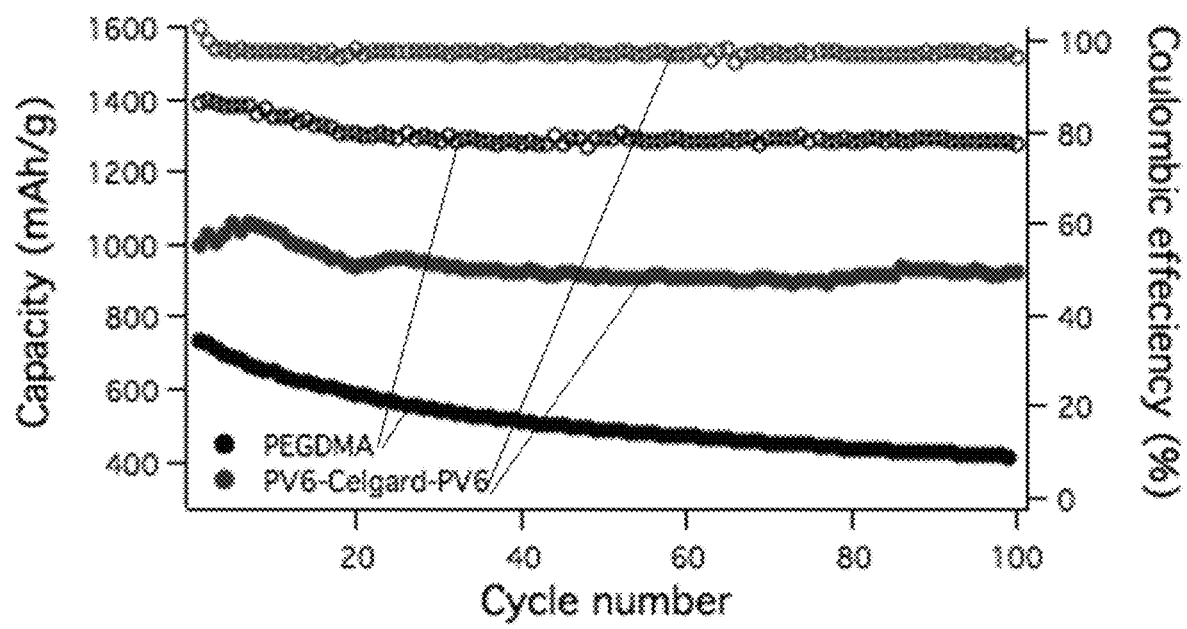
Figure 17A:
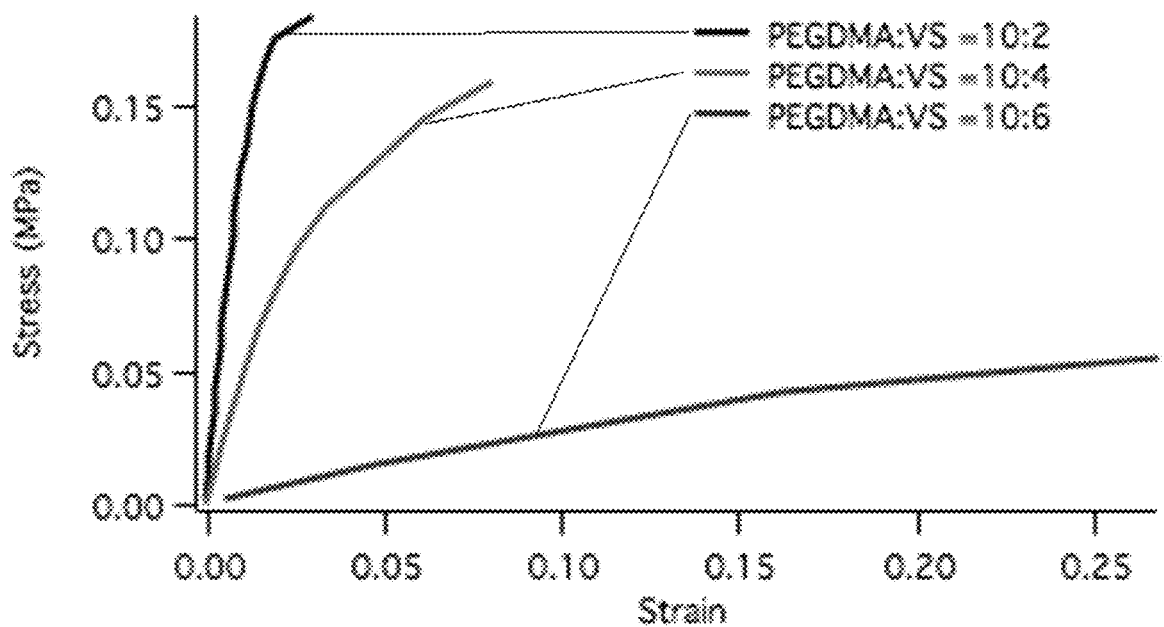
FIGS. 17A and 17B show mechanical properties of (17A) membranes with different sulfonate content; and (17B) sandwich-typed membrane.
Figure 17B:
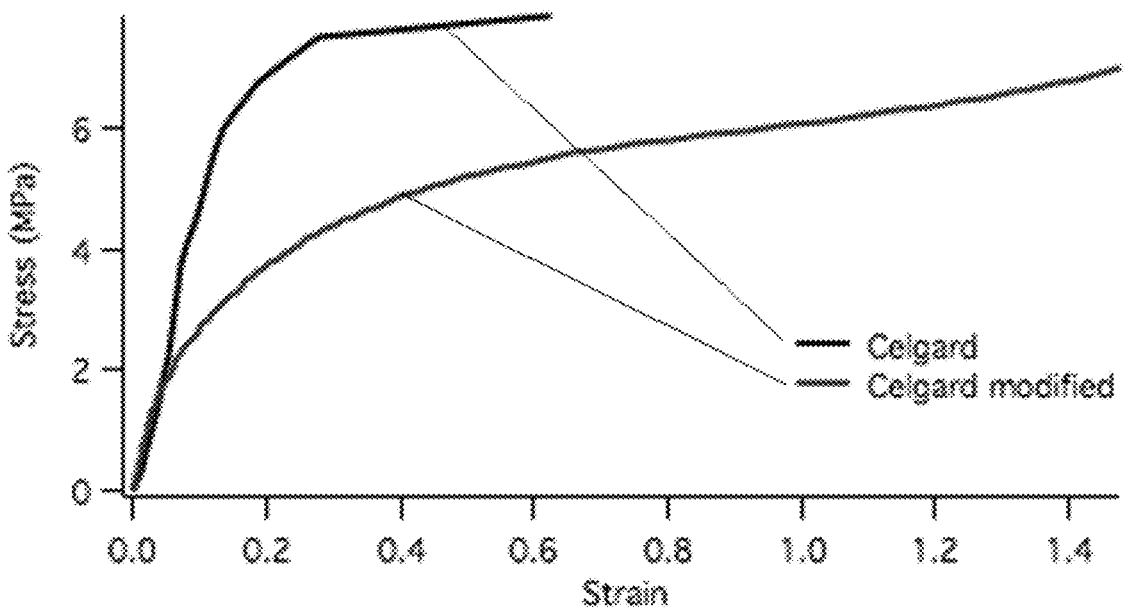
Figure 18A:
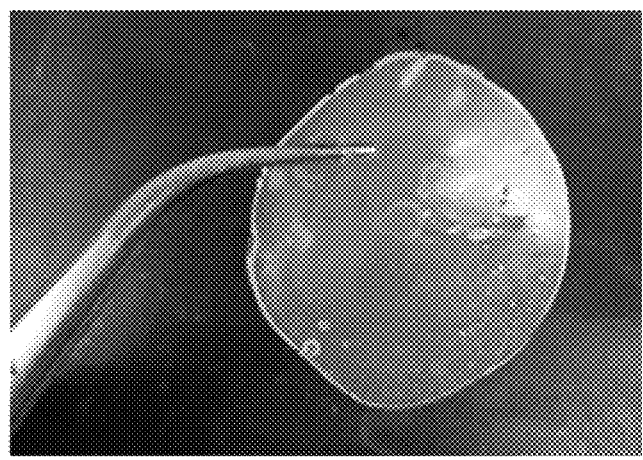
FIGS. 18A-C are photographic images of a PV6-Celgard-PV6 sandwich membrane embodiment.
Figure 18B:
Figure 18C:

The mechanical property of the membranes was tested by DMA (Dynamic Mechanical Analysis), and the results are shown in FIG. 17. A sandwich-type membrane was designed for texting. In the sandwich-type membrane, the core layer is Celgard and PV6 is coated on both sides. This embodiment takes advantage of both the high modulus of Celgard and the single ion conductor of the inventive material. As is shown in FIG. 18, the membrane is still freestanding and highly flexible. More importantly, the mechanical property of the membrane is maintained with a modulus ~30 MPa, as strong as the original Celgard membrane, and the modulus is much higher than the original PV6 membrane. The sandwich membrane was used as a separator in Li—S cell and the same additive-free electrolyte was applied, and the cycling performance is shown in FIG. 16B. It is evident that compared to the embodiment tested in FIG. 16A, the cycleability is greatly improved when the sandwich design is used. Specifically, the cell can operate without failure for 100 cycles, with a high capacity ~1000 mAh/g and a high capacity retention rate of 92%. More importantly, with the presence of large amount of sulfonate groups, the Coulombic efficiency of the cell is above 98% for 100 cycles, which is a significant increase compared to the pure PEGDMA membrane. The result is remarkable because it shows the highest Coulombic efficiency in Li—S cells with an additive-free electrolyte. It is also significant because it shows that embodiments of the inventive material, as highly conductive single ion conductors, can be modified and applied to various energy storage systems.

The above examples thus demonstrate, inter alia, a facile and efficient way to prepare high transference number membrane embodiments in which sulfonate groups are integrated into a polymer network via UV-crosslinking. When infused with a liquid electrolyte, the membrane embodiments exhibit high lithium ion conductivity and are shown by means of direct visual analysis and by electrochemical experiments to provide an effective barrier to diffusion of polysulfide ions. The latter benefits of the materials are demonstrated in Lithium-Sulfur cells where they are shown to promote high efficiency cycling, without the need for $LiNO_3$ additives typically used in Li—S cells to protect the lithium metal anode from reaction with dissolved polysulfides.

Clauses

The following clauses describe certain non-limiting embodiments of the invention.

Clause 1. A cross-linked polymeric material formed by polymerizing a polyethylene glycol di(meth)acrylate and a sulfonate salt containing a double bond that facilitates covalent bonding of the sulfonate salt to the polyethylene glycol di(meth)acrylate, wherein, in said polymeric material, cations from the salt are replaced with metal ions selected from sodium, lithium, aluminum, magnesium, and zinc.

Clause 2. The cross-linked polymeric material according to clause 1, wherein the material has a backbone network structure that comprises 50 to 100 mol % units from the polyethylene glycol di(meth)acrylate and the sulfonate salt.

Clause 3. The cross-linked polymeric material according to clause 1 or clause 2, wherein the material comprises 20 to 98 mol % polyethylene glycol di(meth)acrylate units, and 1 to 80 mol % sulfonate salt units.

Clause 4. The cross-linked polymeric material according to any one of clauses 1 to 3, wherein the polyethylene glycol di(meth)acrylate is polyethylene glycol dimethacrylate (PEGDMA).

Clause 5. The cross-linked polymeric material according to any one of clauses 1 to 4, wherein the sulfonate salt is vinylsulfonic acid sodium salt.

Clause 6. The cross-linked polymeric material according to any one of clauses 1 to 5, wherein the weight ratio of the polyethylene glycol di(meth)acrylate to the sulfonate salt ranges from 10:0.1 to 10:8 (w:w).

Clause 7. The cross-linked polymeric material according to any one of clauses 1 to 4 or 6, wherein the sulfonate salt is of formula (II):

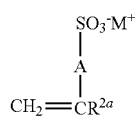

(II)

wherein:

$R^{2a}$ is selected from H and Me;

A is selected from a bond, Ph, $C_{1-6}$alkyl, —C(O)O$C_{1-6}$alkyl, and —C(O)NH$C_{1-6}$alkyl; and M is selected from sodium, lithium, aluminum, magnesium, and zinc.

Clause 8. The cross-linked polymeric material according to any one of clauses 1 to 7, wherein the metal ions are lithium ions.

Clause 9. The cross-linked polymeric material according to any one of clauses 1 to 8, comprising a repeating unit of formula (I):

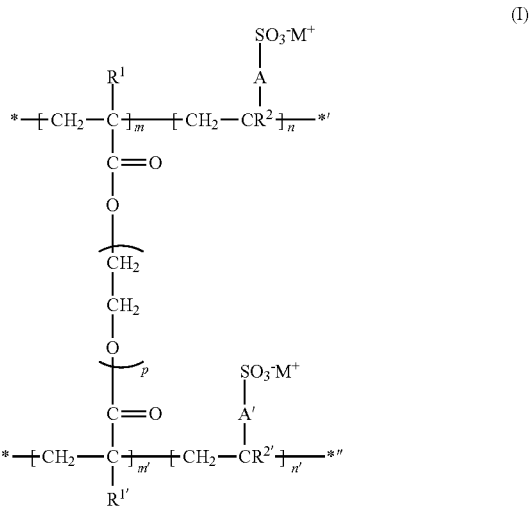

(I)

wherein:

$R^1$ and $R^{1'}$ are individually selected from hydrogen and methyl;

$R^2$ and $R^{2'}$ are individually selected from H, Me, H,H and H,Me;

A and A' are individually selected from a bond, Ph, $C_{1-6}$alkyl, —C(O)O$C_{1-6}$alkyl, and —C(O)NH$C_{1-6}$alkyl;

M and M' are individually selected from sodium, lithium, aluminum, magnesium, and zinc;

m and m' are each an integer selected from 1 to 50;

n is an integer selected from 1 to 30;

n' is an integer selected from 0 to 30;

p is an integer selected from 2 to 20;

each * indicates a point of attachment to an adjacent polymer repeating unit; and

*' and *" indicate a point of attachment to an adjacent polymer repeating unit, or, when $R^2$ or $R^{2'}$ is H,H or H,Me, *' or *", respectively, is absent.

Clause 10. The cross-linked polymeric material according to clause 9, wherein m is 1 and n is 1.

Clause 11. The cross-linked polymeric material according to clause 9 or clause 10, wherein p is 2.

Clause 12. The cross-linked polymeric material according to any one of clauses 9-11, wherein R and R' are methyl.

Clause 13. The cross-linked polymeric material according to any one of clauses 9-12, wherein M is lithium.

Clause 14. The cross-linked polymeric material according to any one of clauses 9-13, wherein $R^2$ is H, and A is a bond.

Clause 15. A membrane comprising the cross-linked polymeric material according to any one of clauses 1 to 14.

Clause 16. The membrane according to clause 15, wherein, when saturated with organic solvents 1,3-dioxolane (DOL) and 1,2-dimethoxyethane (DME) at a volume ratio of 1:1, the membrane exhibits ionic conductivity of at least $10^{-4}$ S/cm at room temperature.

Clause 17. The membrane according to clause 15 or clause 16, wherein, when saturated with an organic solvent mixture comprising 1,3-dioxolane (DOL) and 1,2-dimethoxyethane (DME) at a volume ratio of 1:1, said organic solvent mixture additionally comprising a dissolved salt selected from the group consisting of lithium bis(trifluoromethanesulfone) imide (LiTFSI), lithium triflate ($LiSOO_3CF_3$), lithium chlorate (LiClO4), lithium hexafluoro phosphate (LiPF6), or their sodium or aluminium analogs, the membrane exhibits ionic conductivity of at least $3 \times 10^{-4}$ S/cm or higher at 25° C.

Clause 18. A battery comprising the membrane according to any one of clauses 15-17.

Clause 19. The battery according to clause 18, wherein said battery is selected from a metal sulfur battery and a metal anode with a conversion (e.g. $O_2$, $CO_2$, $I_2$) or intercalating material (e.g. $LiFePO_4$), cathode metal battery.

Clause 20. The battery according to clause 18 or clause 19, wherein the battery is a metal sulfur battery selected from an Li—S, Na—S, and Al—S battery.

Clause 21. The battery according to clause 20, wherein the batter is a Li—S battery.

Clause 22. A method of making the cross-linked polymeric material according to any one of clauses 1-14, said method comprising:
copolymerizing a reaction mixture comprising polyethylene glycol di(meth)acrylate and a sulfonate salt containing a double bond that facilitates covalent bonding of the sulfonate salt to the polyethylene glycol di(meth)acrylate; and
performing ion exchange, thereby replacing cations from the salt with metal ions selected from sodium, lithium, aluminum, magnesium, and zinc, and combinations thereof.

Clause 23. The method according to clause 23, wherein the sulfonate salt is of formula (II):

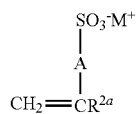

(II)

wherein:
$R^{2a}$ is selected from H and Me;
A is selected from a bond, Ph, $C_{1-6}$alkyl, —C(O)O$C_{1-6}$alkyl, and —C(O)NH$C_{1-6}$alkyl; and
M is selected from sodium, lithium, aluminum, magnesium, and zinc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), "contain" (and any form contain, such as "contains" and "containing"), and any other grammatical variant thereof, are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a composition or article that "comprises", "has", "includes" or "contains" one or more features possesses those one or more features, but is not limited to possessing only those one or more features.

As used herein, the terms "comprising," "has," "including," "containing," and other grammatical variants thereof encompass the terms "consisting of" and "consisting essentially of."

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

All publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While several aspects and embodiments of the present invention have been described and depicted herein, alternative aspects and embodiments may be affected by those skilled in the art to accomplish the same objectives. Accordingly, this disclosure and the appended claims are intended to cover all such further and alternative aspects and embodiments as fall within the true spirit and scope of the invention.

The invention claimed is:

1. A cross-linked polymeric material formed by polymerizing a polyethylene glycol di(meth)acrylate and a sulfonate salt containing a double bond that facilitates covalent bonding of the sulfonate salt to the polyethylene glycol di(meth)acrylate, wherein, in said polymeric material, cations from the salt are replaced with metal ions selected from sodium, lithium, aluminum, magnesium, and zinc, and combinations thereof, wherein:
(a) the sulfonate salt is vinylsulfonic acid sodium salt; and/or
(b) the metal ions are lithium ions; and/or
(c) the cross-linked polymeric material comprises a repeating unit of formula (I):

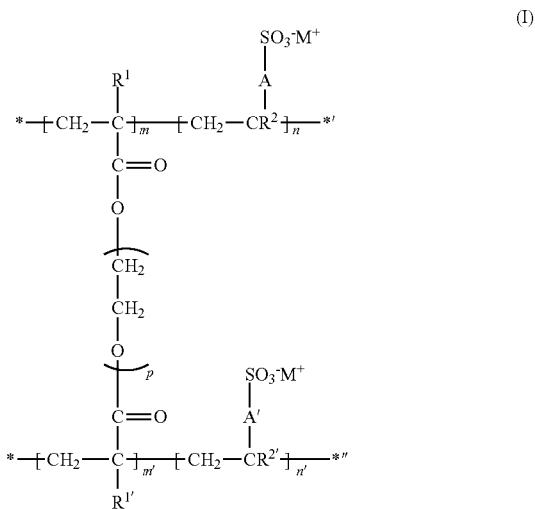

wherein:
R$^1$ and R$^{1'}$ are individually selected from hydrogen and methyl;
R$^2$ and R$^{2'}$ are individually selected from H, Me, H,H and H,Me;
A and A' are individually selected from a bond, Ph, C$_{1-6}$alkyl, —C(O)OC$_{1-6}$alkyl, and —C(O)NHC$_{1-6}$alkyl;
M and M' are individually selected from sodium, lithium, aluminum, magnesium, and zinc;
m and m' are each an integer selected from 1 to 50;
n is an integer selected from 1 to 30;
n' is an integer selected from 0 to 30;
p is an integer selected from 2 to 20;
each * indicates a point of attachment to an adjacent polymer repeating unit; and
*' and *" indicate a point of attachment to an adjacent polymer repeating unit, or, when R$^2$ or R$^{2'}$ is H,H or H,Me, *' or *", respectively, is absent.

2. The cross-linked polymeric material according to claim 1, wherein the material has a backbone network structure that comprises 50 to 100 mol % units from the polyethylene glycol di(meth)acrylate and the sulfonate salt.

3. The cross-linked polymeric material according to claim 1, wherein the material comprises 20 to 98 mol % polyethylene glycol di(meth)acrylate units, and 1 to 80 mol % sulfonate salt units.

4. The cross-linked polymeric material according to claim 1, wherein the polyethylene glycol di(meth)acrylate is polyethylene glycol dimethacrylate (PEGDMA).

5. The cross-linked polymeric material according to claim 1, wherein the sulfonate salt is vinylsulfonic acid sodium salt.

6. The cross-linked polymeric material according to claim 1, wherein the weight ratio of the polyethylene glycol di(meth)acrylate to the sulfonate salt ranges from 10:0.1 to 10:8 (w:w).

7. The cross-linked polymeric material according to claim 1, wherein the sulfonate salt is of formula (II):

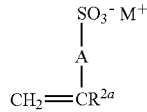

(II)

wherein:
R$^{2a}$ is selected from H and Me;
A is selected from a bond, Ph, C$_{1-6}$alkyl, —C(O)OC$_{1-6}$alkyl, and C(O)NHC$_{1-6}$alkyl; and
M is selected from sodium, lithium, aluminum, magnesium, and zinc.

8. The cross-linked polymeric material according to claim 1, wherein the metal ions are lithium ions.

9. The cross-linked polymeric material according to claim 1, comprising the repeating unit of formula (I).

10. The cross-linked polymeric material according to claim 9, wherein m is 1 and n is 1.

11. The cross-linked polymeric material according to claim 9, wherein p is 2.

12. The cross-linked polymeric material according to claim 9, wherein R$^1$ and R$^{1'}$ are methyl.

13. The cross-linked polymeric material according to claim 9, wherein M is lithium.

14. The cross-linked polymeric material according to claim 9, wherein R$^2$ is H, and A is a bond.

15. A membrane comprising the cross-linked polymeric material according to claim 1.

16. The membrane according to claim 15, wherein, when saturated with organic solvents 1,3-dioxolane (DOL) and 1,2-dimethoxyethane (DME) at a volume ratio of 1:1, the membrane exhibits ionic conductivity of at least 10$^{-4}$ S/cm at room temperature.

17. The membrane according to claim 15, wherein, when saturated with an organic solvent mixture comprising 1,3-dioxolane (DOL) and 1,2-dimethoxyethane (DME) at a volume ratio of 1:1, said organic solvent mixture additionally comprising a dissolved salt selected from the group consisting of lithium bis(trifluoromethanesulfone) imide (LiTFSI), lithium triflate (LiSO$_3$CF$_3$), lithium chlorate (LiClO4), lithium hexafluoro phosphate (LiPF6), or their sodium or aluminium analogs, the membrane exhibits ionic conductivity of at least 3 ×10$^{-4}$ S/cm or higher at 25° C.

18. A battery comprising a membrane, wherein the membrane comprises a cross-linked polymeric material formed by polymerizing a polyethylene glycol di(meth)acrylate and a sulfonate salt containing a double bond that facilitates covalent bonding of the sulfonate salt to the polyethylene glycol di(meth)acrylate, wherein, in said polymeric material, cations from the salt are replaced with metal ions selected from sodium, lithium, aluminum, magnesium, and zinc.

19. A method of making the cross-linked polymeric material according to claim 1, said method comprising:
copolymerizing a reaction mixture comprising polyethylene glycol di(meth)acrylate and a sulfonate salt containing a double bond that facilitates covalent bonding of the sulfonate salt to the polyethylene glycol di(meth)acrylate; and
performing ion exchange, thereby replacing cations from the salt with metal ions selected from sodium, lithium, aluminum, magnesium, and zinc, and combinations thereof.

20. The method according to claim 19, wherein the sulfonate salt is of formula (II):

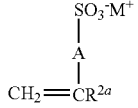

(II)

wherein:
R$^{2a}$ is selected from H and Me;
A is selected from a bond, Ph, C$_{1-6}$alkyl, —C(O)OC$_{1-6}$alkyl, and —C(O)NHC$_{1-6}$alkyl; and M is selected from sodium, lithium, aluminum, magnesium, and zinc.

* * * * *